United States Patent
Nakayama

(10) Patent No.: US 7,835,582 B2
(45) Date of Patent: Nov. 16, 2010

(54) IMAGE ENCODING APPARATUS AND CONTROL METHOD THEREOF

(75) Inventor: Tadayoshi Nakayama, Adachi-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 929 days.

(21) Appl. No.: 11/681,002

(22) Filed: Mar. 1, 2007

(65) Prior Publication Data

US 2007/0206868 A1 Sep. 6, 2007

(30) Foreign Application Priority Data

Mar. 2, 2006 (JP) .............................. 2006-056904

(51) Int. Cl.
*G06K 9/34* (2006.01)
*G06K 9/36* (2006.01)
*G06K 9/46* (2006.01)

(52) U.S. Cl. ...................... 382/239; 382/176; 382/232; 382/234; 382/244

(58) Field of Classification Search ................. 382/232, 382/234, 239, 244, 176
See application file for complete search history.

(56) References Cited

U.S. PATENT DOCUMENTS

| | | | | |
|---|---|---|---|---|
| 5,581,373 | A | 12/1996 | Yoshida | 358/476 |
| 5,801,650 | A | 9/1998 | Nakayama | 341/67 |
| 5,818,970 | A | 10/1998 | Ishikawa et al. | 382/248 |
| 5,841,381 | A | 11/1998 | Nakayama | 341/67 |
| 5,986,594 | A | 11/1999 | Nakayama et al. | 341/107 |
| 6,408,102 | B1 | 6/2002 | Nakayama | 382/246 |
| 6,549,676 | B1 | 4/2003 | Nakayama et al. | 382/246 |
| 6,553,143 | B2 | 4/2003 | Miyake et al. | 382/239 |
| 6,560,365 | B1 | 5/2003 | Nakayama et al. | 382/233 |
| 6,567,562 | B1 | 5/2003 | Nakayama et al. | 382/246 |
| 6,711,295 | B2 | 3/2004 | Nakayama et al. | 382/232 |
| 6,865,299 | B1 | 3/2005 | Nakayama | 382/246 |

(Continued)

FOREIGN PATENT DOCUMENTS

JP 09-149260 6/1997

OTHER PUBLICATIONS

International Standard Document: ISO/IEC IS 14495-1 "Information Technology-Lossless and near-lossless compression of continuous-tone still images: Baseline", First Edition, Dec. 1, 1999.

*Primary Examiner*—Bhavesh M Mehta
*Assistant Examiner*—Bernard Krasnic
(74) *Attorney, Agent, or Firm*—Fitzpatrick, Cella, Harper & Scinto

(57) ABSTRACT

An apparatus and method generate encoded data including lossless- and lossy-encoded data together within a unit time period while fully using the lossy encoding processing capability, by appropriately setting a threshold associated with the number of tiles. To this end, an image encoding apparatus has a lossless encoding processing unit and a lossy encoding processing unit. The lossless encoding processing unit outputs one of lossless-encoded data and non-encoded data from a selection unit to a memory based on the attribute information for each tile. Every time the total data size of non-encoded data output from the selection unit exceeds a predetermined threshold, a resolution converting unit executes processing for decreasing the resolution of the non-encoded data in the memory. Upon completion of storage of data for one page in the memory, a lossy encoding unit begins to generate lossy-encoded data from the non-encoded data.

4 Claims, 22 Drawing Sheets

U.S. PATENT DOCUMENTS

| | | | |
|---|---|---|---|
| 6,898,310 B1 | 5/2005 | Ohmi et al. | 382/166 |
| 6,952,501 B2 | 10/2005 | Nakayama | 382/243 |
| 6,996,593 B2 | 2/2006 | Nakayama | 708/316 |
| 7,106,911 B2 | 9/2006 | Ohta et al. | 382/251 |
| 7,127,115 B2 | 10/2006 | Osawa et al. | 382/239 |
| 7,194,140 B2 | 3/2007 | Ito et al. | 382/251 |
| 7,227,998 B2 | 6/2007 | Nakayama et al. | 382/232 |
| 7,236,997 B2 | 6/2007 | Nakayama | 708/300 |
| 7,257,264 B2 | 8/2007 | Nakayama et al. | 382/239 |
| 2002/0051223 A1* | 5/2002 | Izumi et al. | 358/402 |
| 2003/0169452 A1* | 9/2003 | Engbrocks | 358/1.18 |
| 2004/0258320 A1 | 12/2004 | Nakayama | 382/250 |
| 2005/0100226 A1 | 5/2005 | Kajiwara et al. | 382/232 |
| 2005/0244060 A1* | 11/2005 | Nagarajan et al. | 382/232 |
| 2005/0276500 A1 | 12/2005 | Nakayama et al. | 382/251 |
| 2005/0276501 A1 | 12/2005 | Nakayama et al. | 382/251 |
| 2006/0039626 A1 | 2/2006 | Nakayama | 382/276 |
| 2007/0025632 A1 | 2/2007 | Nakayama | 382/251 |
| 2007/0098285 A1* | 5/2007 | Yahata et al. | 382/239 |
| 2007/0206868 A1 | 9/2007 | Nakayama | 382/232 |

\* cited by examiner

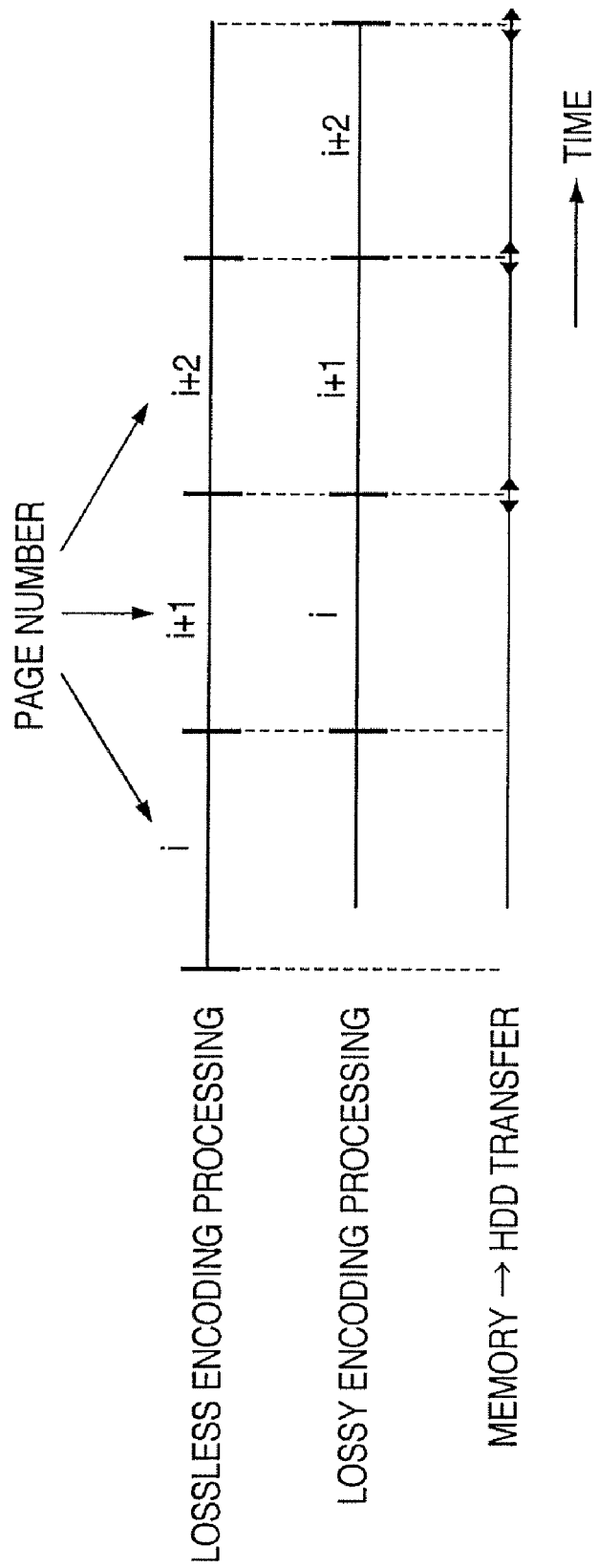

2400-dpi
NON-COMPRESSED
DATA SIZE ON MEMORY 1200-dpi
RESOLUTION-CONVERTED
DATA SIZE OF
DATA IN FIG. 9A 1200-dpi
RESOLUTION-CONVERTED
DATA SIZE OF INPUT IMAGE
(NON-COMPRESSED DATA)

1200-dpi
NON-COMPRESSED
DATA SIZE ON MEMORY

ONE PAGE TIME PERIOD 2400-dpi NON-COMPRESSED DATA SIZE ON MEMORY 1200-dpi NON-COMPRESSED DATA SIZE ON MEMORY 600-dpi NON-COMPRESSED DATA SIZE ON MEMORY

TIME

IMAGE ENCODING APPARATUS AND CONTROL METHOD THEREOF

BACKGROUND OF THE INVENTION

1. Field of the Invention

The present invention relates to a technique for lossless- or lossy-encoding image data for respective tiles.

2. Description of the Related Art

Upon categorizing image data based on the criteria of resolution and tone characteristics, they are roughly categorized into text (character)-based images which place importance on a high resolution, natural image-based images (image such as natural image) which place an importance on tone expression, and graphics-based images which place an importance on the balance between both criteria.

As will be described below, suitable encoding methods differ depending on the types (or attributes) of image data.

A text-based image is normally formed of two types of pixels from a local viewpoint even when image data is input as multi-valued data. For this reason, the text-based image is suited to lossless encoding compared to other types of images.

Put differently, since the image entropy is low, the text-based image is suited to lossless encoding. However, since the entropy is low, a slight deterioration often visually stands out. Therefore, a high-quality text-based image is required to be lossless-encoded.

By contrast, a natural image-based image normally has a high entropy (although it largely differs depending on objects). For this reason, if the natural image-based image is lossless-encoded, not so high compression ratio is expected. By applying encoding that allows deterioration of a visually inconspicuous part to the image of this type, a high compression ratio can be achieved. Such encoding is called lossy encoding as contrasted to the lossless encoding.

Therefore, a device which is required to attain high image quality adopts a method of compressing text-based image data by lossless encoding and natural image-based image data by lossy encoding.

On the frequency axis, deterioration in a higher-frequency range is hard to stand out compared to that in a lower-frequency range. In lossy encoding, it is a common practice to transform image data on a real space into frequency space data. As typical transformation, discrete cosine transformation (DCT) is known. Quantization processing required to reduce entropy is applied to the data transformed onto the frequency space. In this case, a quantization table has frequency dependence so that deterioration is suppressed as much as possible in the lower-frequency range, and it readily appears in the higher-frequency range. Finally, the quantized values undergo entropy-encoding using Huffman codes or the like.

Random noise is inevitably superposed on natural image data since the natural image data is generated by A/D-converting a signal photoelectrically converted by an image sensing element. Such random noise-superposed data is very ill-suited to lossless encoding.

By contrast, a computer graphics-based image (to be referred to as a CG image hereinafter) is basically free from any random noise, and is suited to lossless encoding in this respect. Meanwhile, a CG image includes sharp edges which are not included in a natural image, and is unsuited to the DCT transformation.

The types of CG images are infinite in variety, i.e., there are many types of CG images from those with a fewer number of tone levels to those with a larger number of tone levels. In an extreme case, a CG image approximate to a natural image can be generated. For this reason, it cannot be categorically described that CG images are always suited to lossless encoding. Therefore, CG images include those suited to lossless encoding, and those suited to lossy encoding.

Since the aforementioned discrete cosine transformation is arithmetic processing including multiplications of real number coefficients, many processes are required (e.g., quantized values must be re-arranged to a predetermined order before entropy encoding, and so forth) in addition to simple integer operations. For this reason, a lossy encoder often requires a larger hardware scale.

By contrast, lossless encoding does not require any real number operations, and can carry out processing using only integer values to the end. Also, lossless encoding does not require any re-arrangement of data as long as transformation onto the frequency space is not made, and the hardware scale can be simplified.

In recent years, in order to attain higher image quality of output devices such as printers and the like, output devices tend to have higher resolutions. Image data tend to have higher resolutions accordingly, and the resolution of an image which previously had been 600 dpi tends to rise up to 1200 dpi and to 2400 dpi.

This means that the capabilities required of software and hardware used to encode and decode image data rise to 4 times and 16 times.

A technique for lossless- or lossy-encoding image data in predetermined units such as blocks or tiles is known (for example, Japanese Patent Laid-Open No. 09-149260).

An overview of this technique can be expressed by an arrangement shown in FIG. 4. In the arrangement shown in FIG. 4, image data 401 scanned from an image scanner or generated by rendering page description language data is divided into tiles. A lossless encoding unit 403 and lossy encoding unit 405 parallelly apply encoding processing to one tile. A determination unit 407 determines based on code sizes generated by the respective encoding units and various parameters obtained during the encoding processes whether or not the image data is to be lossless- or lossy-encoded, and sends the determination result to a selection unit 409.

The selection unit 409 selects one of the two different types of encoded data output from the two encoding units based on the determination result, and stores the selected encoded image data in a memory 411. In this way, encoding of one tile is completed. Upon completion of encoding of all tile data for one page image, the encoded data of the page image are transferred to and stored in a hard disk drive 413 together.

The memory 411 is a so-called semiconductor memory, and can only hold encoded data for several to several tens of pages. On the other hand, since the hard disk drive 413 generally has a capacity of several hundred Gbytes nowadays, it can store encoded data for several tens of thousands of pages or more.

Also, an arrangement shown in FIG. 5 can be easily considered. In this arrangement, a determination unit 421 has a function of directly generating parameters required to determine lossless or lossy encoding from tile data. This determination unit 421 determines, based on the generated parameters, which encoded data is to be selected. The determination result is sent to a distribution unit 423, which supplies tile data to one of the lossless encoding unit 403 and lossy encoding unit 405, and controls the selected encoding unit to encode the tile data. As a result, since one of the two encoding units outputs encoded data, encoding of that tile data is completed when that encoded data is stored in the memory 411.

In either of the arrangements shown in FIGS. 4 and 5, in order to encode arbitrary image data within a predetermined period of time (to be referred to as "Tone page time period" hereinafter), each of the two encoding units must have capability to encode all image data for one page within one page time period.

Assuming that one encoding unit is used at a capacity usage ratio of 85% to encode all image data with a resolution of 600 dpi within one page time period, image data with a resolution of 1200 dpi has a fourfold data size. For this reason, encoding must be done by parallelly operating the four encoding units. Furthermore, since an image with a resolution of 2400 dpi has a 16-fold data size, its encoding process cannot be completed within one page time period unless 14 to 16 encoding units are parallelly operated. In case of the 14 encoding units, encoding processing can be done within one page time period if each encoding unit is operated at a capacity usage ratio of 16×0.85/14×100 (%)≈97.1 (%) or higher.

As described above, conventionally, encoding must be done by parallelly operating many encoding units to encode image data with higher resolutions in large quantities, resulting in a huge circuit scale of the encoding units. Therefore, high cost is required to manufacture that encoding apparatus.

In order to reduce the hardware scale, the degree of parallelism of lossy encoding units to be parallelly operated is lowered. However, when the degree of parallelism is lowered, the capability of each lossy encoding unit drops, and the lossy encoding processing cannot be completed within a predetermined period of time, thus posing another problem.

SUMMARY OF THE INVENTION

The present invention provides a technique that can solve the conventional problems mentioned above.

To solve the above problems, an image encoding apparatus provided by the present invention comprises, e.g., the following arrangement. That is, there is provided an image encoding apparatus comprising:

determination means for determining for respective tiles whether image data of a page of interest is to be lossless-encoded or lossy-encoded;

lossless encoding means for lossless-encoding tile image data which is determined by the determination means to be lossless-encoded;

storage means for temporarily storing tile image data which is determined by the determination means to be lossy-encoded;

resolution converting means for reducing the number of pixels of non-compressed tile image data held in the storage means so that a data size of the non-compressed tile image data held in the storage means becomes not more than a predetermined size, during lossless encoding of the image data of the page of interest; and lossy encoding means for lossy-encoding the non-compressed tile image data of the page of interest held in the storage means after completion of the lossless encoding of the image data of the page of interest.

According to the present invention, by appropriately setting a threshold associated with the number of tiles, lossy encoding processing capability is fully used, while encoded data including lossless- and lossy-encoded data together can be generated within a unit time period.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 is a timing chart of encoding processing in one embodiment;

DESCRIPTION OF THE EMBODIMENTS

Preferred embodiments of the present invention will be describe in detail hereinafter with reference to the accompanying drawings.

First Embodiment

Figure 1:
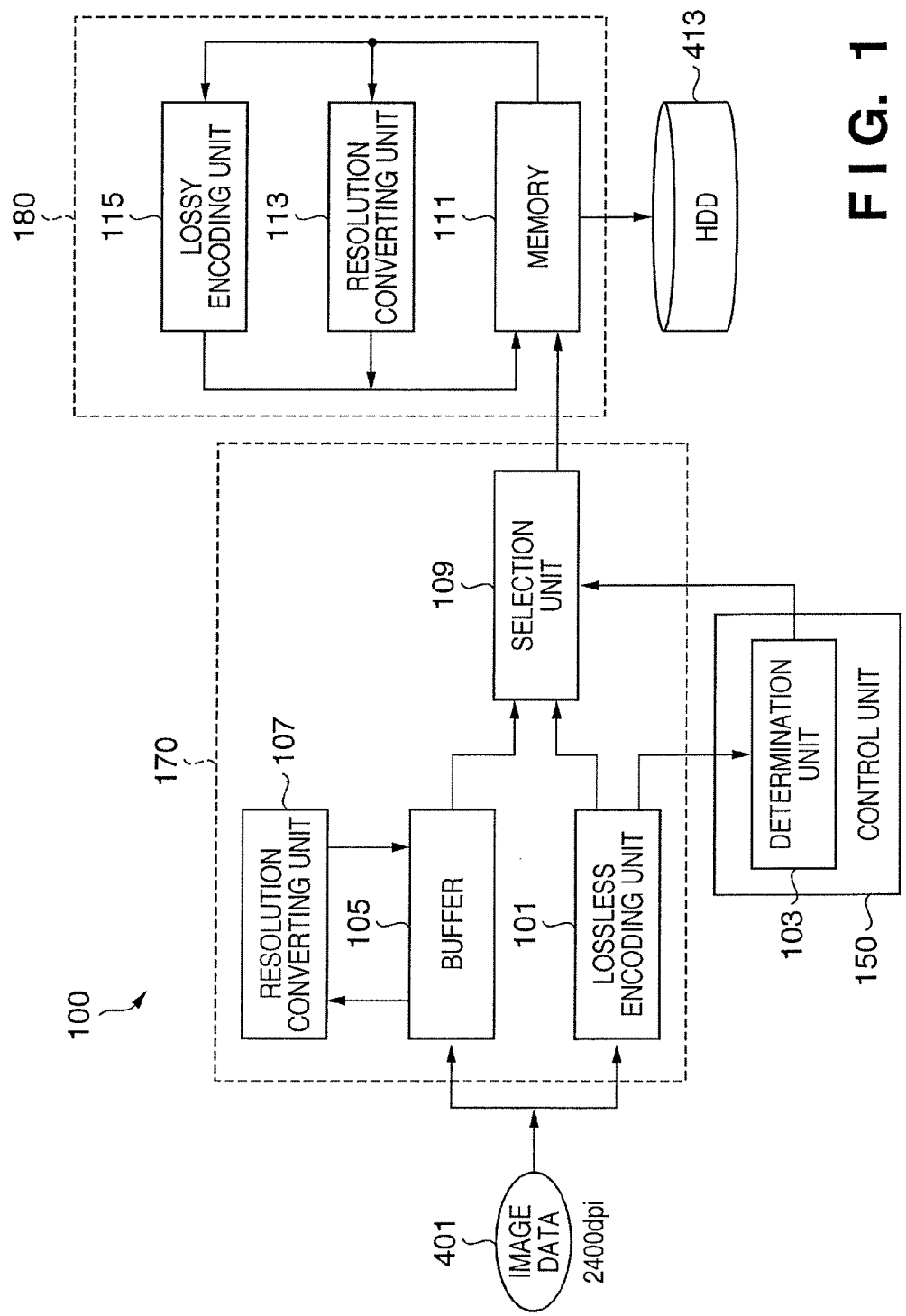
FIG. 1 is a block diagram of an image encoding apparatus according to the first embodiment.

FIG. 1 shows the first basic arrangement required to implement encoding processing as a characteristic feature of this embodiment, and its operation will be explained using FIGS. 6 to 10C.

The arrangement of an image processing apparatus 100 shown in FIG. 1 will be briefly described first.

The image processing apparatus shown in FIG. 1 is roughly separated into a lossless encoding processing unit 170 and a lossy encoding processing unit 180. The image processing apparatus 100 receives image data 401 scanned from an image scanner or generated by rendering page description language data. A lossless encoding unit 101 lossless-encodes the input image data. Assume that the resolution of the image data 401 is 2400 dpi.

Note that this embodiment uses a JPEG-LS encoding scheme known as one example of lossless encoding. Please refer to [International Standard Document: ISO/IEC IS 14495-1, "Information technology—Lossless and near-lossless compression of continuous-tone still images: Baseline"] for details of this technique.

To state briefly, the JPEG-LS encoding scheme executes lossless encoding of multi-valued pixels in a raster scan order using a nonlinear adaptive filter and context-based entropy encoding.

In order to obtain the context of each pixel to be encoded, a predetermined arithmetic operation is made with reference to surrounding pixels of the pixel of interest. At this time, by slightly adding processes, image attribute information including the number of colors, the degree of change, and the histogram of pixel values of surrounding pixels can be obtained.

A control unit 150 controls respective building units shown in FIG. 1, and includes a determination unit 103 to be described later.

The image data 401 is divided into tiles each having a size of, e.g., 32×32 pixels, and these tile data are input to the apparatus of this embodiment. The lossless encoding unit 101 lossless-encodes the input tile data to generate lossless encoded data, and outputs the lossless encoded data to a selection unit 109. Also, the lossless encoding unit 101 obtains the aforementioned image attribute information for each tile, and outputs it to the determination unit 103. The determination unit 103 determines based on this image attribute information whether the tile data of interest is to be finally lossless-encoded or lossy-encoded.

The tile data during lossless encoding is also sent to a buffer 105, and is stored as non-encoded data (non-compressed data) in that buffer. The buffer 105 keeps holding the non-encoded data of the tile of interest until the determination unit 103 outputs the determination result.

The determination result output from the determination unit 103 is sent to the selection unit 109. If this determination result indicates "lossless", the selection unit 109 selects the encoded data output from the lossless encoding unit 101; if the determination result indicates "lossy", the selection unit 109 selects the non-encoded data saved in the buffer 105 and stores it in a memory 111. At this time, the selection unit 109 stores 1-bit information indicating lossless-encoded data or non-encoded data in the header field of the data to be stored in the memory 111.

The aforementioned processes collectively mean <lossless encoding processing>. In this embodiment, this <lossless encoding processing> is completed within one page time period. Then, <lossy encoding processing> to be described later is executed within the next one page time period. The timing relationship between <lossless encoding processing> and <lossy encoding processing> will be described below using FIG. 6. Note that one page time period corresponds to an input cycle of image data to be input.

Both <lossless encoding processing> and <lossy encoding processing> execute encoding required for image data for one page within one page time period. As will be described later, two encoding processes are not simultaneously applied to the same page. More specifically, as shown in FIG. 6, a page image that has undergone <lossless encoding processing> then undergoes <lossy encoding processing> in the next page time period. The encoded data of the image which has undergone <lossy encoding processing> is finally transferred from the memory 111 to a storage device such as a hard disk drive or the like.

Paying attention to only an image of a given page, two page time periods are required to apply the lossless and lossy encoding processes. However, as a throughput (processing capability) upon encoding images for a plurality of pages, since the processes are done in a pipeline manner, as shown in FIG. 6, the encoding processing of an image for one page can be substantially completed within one page time period.

In <lossy encoding processing>, a lossy encoding unit 115 lossy-encodes the non-encoded data in the memory 111 within one page time period to convert it into lossy encoded data.

This embodiment uses a known JPEG encoding scheme as an example of lossy encoding, which orthogonally transforms image data corresponding to 8×8 pixels, quantizes transformation coefficients, and then applies Huffman encoding processing to the quantized values.

Since the object of the present invention is to reduce cost by reducing the circuit scale of the lossy encoding unit 115, this lossy encoding unit 115 is not capable of encoding all image data for one page within one page time period. That is, assume that the lossy encoding unit 115 is only capable of encoding N % of all the image data.

This capability is not determined first but is determined depending on the specification of the image processing apparatus of this embodiment, the processing capability of a lossy encoder alone, and the number of encoders to be parallelly operated. However, this embodiment assumes a capability within the range of $N=(1/16 \text{ to } 1/14) \times 100\%$ in consideration of the resolution of image data to be encoded and the input rate of each page.

The determination unit 103 determines whether the tile of interest is to be lossy-encoded or lossless-encoded, and counts the number of input tiles and the number of tiles to be lossy-encoded. Note that the ratio of the number of tiles to be lossy-encoded to the total number of tiles of one page of image data (to be referred to as a "lossy-encoding ratio" hereinafter) exceeds N %. In this case, the lossy encoding processing of the non-encoded data in the memory 111 cannot be completed within one page time period.

In order to solve this problem, the image processing apparatus of this embodiment recursively applies resolution conversion to the non-encoded data to reduce a data size, so that the data to be lossy-encoded becomes N % or less.

Whether or not to apply resolution conversion and the number of stages to be applied upon application of resolution conversion are controlled based on the lossy encoding ratio. How the flow of the resolution conversion processing changes depending on the lossy encoding ratio will be explained below.

<When lossy encoding ratio≦N (%)>

As described above, upon outputting the determination result (also called a selection signal) to the selection unit 109, the determination unit 103 counts the number of tiles determined as "lossy". The total number of tiles of an image for one page depends on the number of pixels of input image data. Therefore, the lossy encoding ratio upon completion of the lossless encoding processing for one page can be calculated as the ratio of the number of tiles determined as "lossy" to the total number of tiles. The processing executed <when lossy encoding ratio≦N (%)> to be described below is also processing to be executed when the lossy encoding ratio does not exceed N % upon completion of the lossless encoding processing for an image of one page.

If the ratio of tiles to be lossy-encoded determined by the determination unit 103 is N % or less, since the ratio of the corresponding non-encoded data also becomes N % or less, the lossy encoding processing can be completed within one page time period without any resolution conversion. Independency of a region to be lossy-encoded on the location within a page as long as the ratio is N % or less will be explained below using FIGS. 7A, 7B, and 8.

Figure 7B:
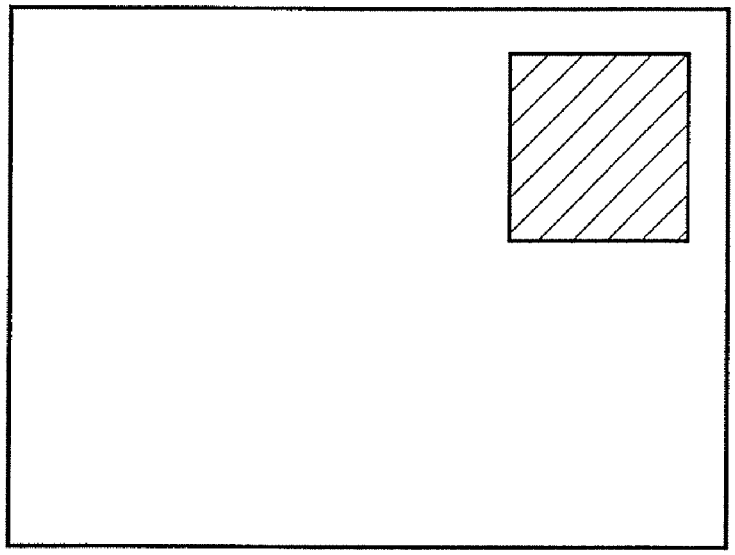
FIGS. 7A and 7B show examples of layouts of regions which are determined to undergo lossy encoding.
Figure 7A:
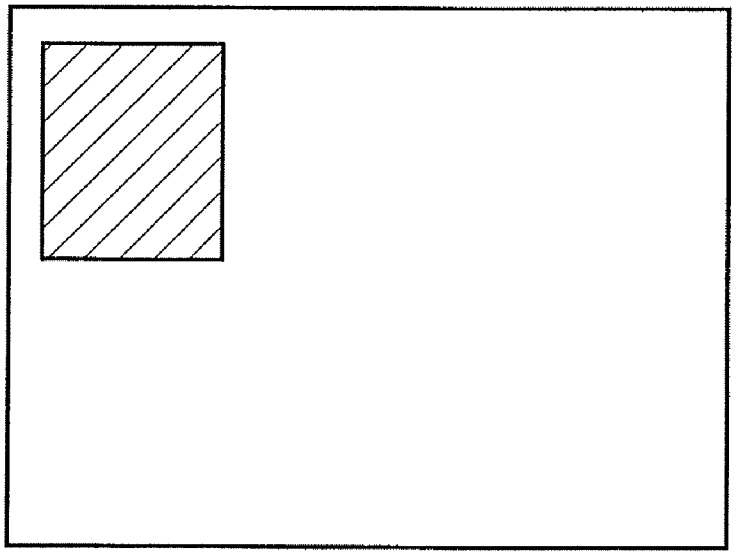

Of two page images shown in FIGS. 7A and 7B, a region to be determined as that to be lossy-encoded exists N % on the upper right portion of that page on an image with page number "1" shown in FIG. 7A. In this case, the memory 111 begins to store non-encoded data in an early stage within one page time period, as indicated by the upper row of FIG. 8, and stores the non-encoded data at a ratio of N %.

Figure 8:
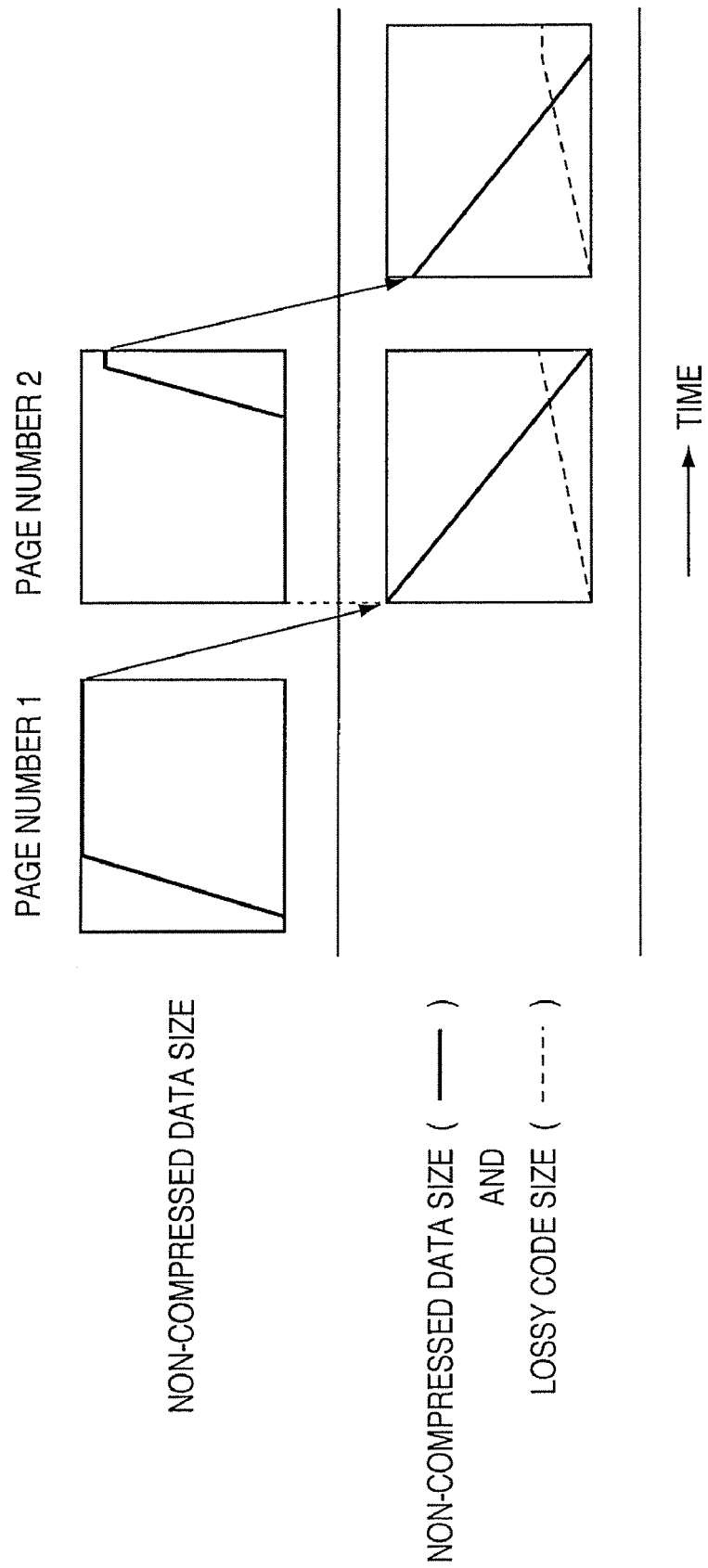
FIG. 8 shows a state of an increase/decrease in non-encoded data and an increase in lossy-encoded data without resolution conversion.

The lossy encoding unit 115 lossy-encodes the stored non-encoded data fully using the next page time period and converts them into lossy-encoded data. The lower row of FIG. 8 shows the way a non-encoded data size decreases and the way an encoded data size increases.

In this way, after an elapse of two page time periods, all the image data of the page to be encoded are encoded, and are converted into lossy-encoded data or lossless-encoded data that have already been encoded one page time period before.

On an image with page number "2" as the second example shown in FIG. 7B, a region to be determined as that to be lossy-encoded exists nearly N % on the lower right part of the page. In this case, the memory 111 begins to store non-encoded data in a latter stage within one page time period, as indicated by the upper column of FIG. 8, and stores the non-encoded data at a ratio of nearly N %.

Independently of the location of the region to be determined as that to be lossy-encoded on a page, the start time of the lossy encoding processing in the next page time period remains the same, but the end time of the lossy encoding processing varies depending on the ratio of the lossy-encoded data size. The two examples shown in the lower column of FIG. 8 show such difference. Since the image with page number "2" shown in FIG. 7B has a ratio slightly lower than N %, its lossy encoding processing is completed earlier accordingly, and the lossy-encoded data size remains constant without increasing from that timing. The same as in the example of page number "1" applies except for the above description.

<When N (%)<lossy encoding ratio≦4×N (%)>

This processing is executed when the lossy encoding ratio exceeds N % during the lossless encoding processing of an image for one page, i.e., before completion of the lossless encoding processing of the image for one page.

If the lossy encoding ratio exceeds N % (immediately after the ratio exceeds N %, the lossy encoding ratio is 4×N % or less obviously), the control unit 150 controls resolution converting units 107 and 113 to execute resolution conversion for halving the horizontal and vertical resolutions of non-compressed image data once. As a result, the non-encoded data size can be reduced to ¼. That is, the lossy encoding processing can be done within one page time period. Note that the resolution conversion generates one pixel after conversion per original 2×2 pixels. As an example of this resolution conversion, the value of a pixel at the predetermined position of the original 2×2 pixels is used as one pixel after conversion. Alternatively, the average value of the original 2×2 pixels can be used as the value of a pixel after conversion.

The resolution conversion processing will be described below using the block diagram of the image processing apparatus shown in FIG. 1 and the graphs showing the data sizes of respective resolutions shown in FIGS. 9A to 9D.

While the lossy encoding ratio is N % or less, the image processing apparatus operates, as has been described above. However, when it is detected that the lossy encoding ratio exceeds N % at timing T1 in FIG. 9A, the resolution converting unit halves the numbers of pixels in the horizontal and vertical directions of the non-encoded data with the resolution of 2400 dpi in the memory 111. That is, the resolution is reduced to 1200 dpi. To implement this processing, the control unit 150 requests the resolution converting unit 113 to start the resolution conversion processing.

Upon starting the resolution conversion processing, since 2400-dpi non-encoded data that have already undergone the resolution conversion processing in the memory 111 become unnecessary, they are sequentially discarded. At the same time, non-encoded data after resolution conversion are sequentially stored in the memory 111. That is, the data size of the non-encoded data with the resolution of 2400 dpi decreases as time elapses, and the data size of non-encoded data with the resolution of 1200 dpi increases as time elapses.

Figure 9A:
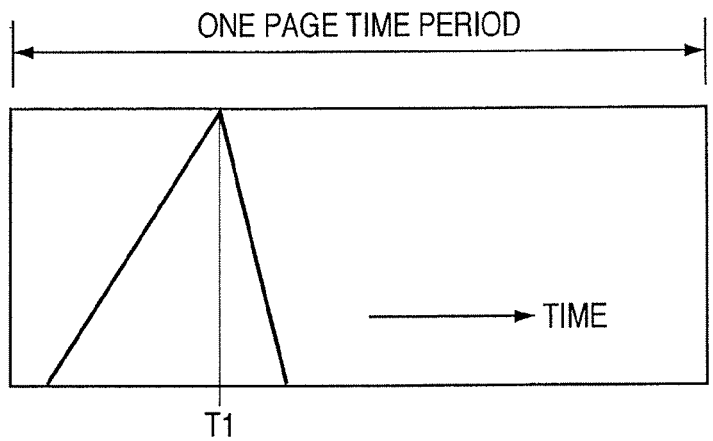
FIGS. 9A to 9D show an increase/decrease in non-encoded data of respective resolutions as a result of resolution conversion (once)
Figure 9B:
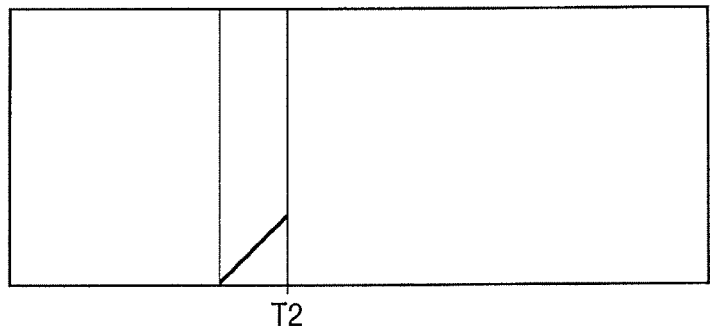

Timing T2 in FIG. 9B indicates the end of the resolution conversion processing. That is, all the non-encoded data with the resolution of 2400 dpi are discarded, and 1200-dpi non-encoded data having the data size ¼ that of the 2400-dpi non-encoded data are stored in the memory 111.

Figure 9C:
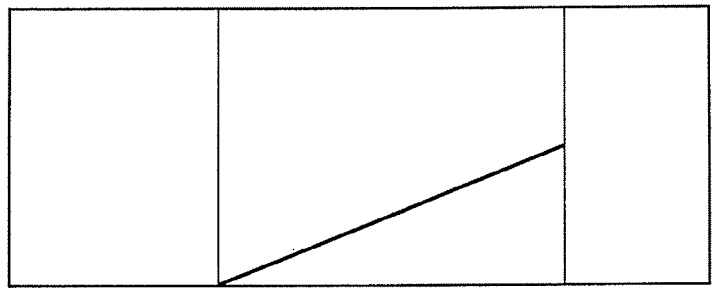
Figure 9D:
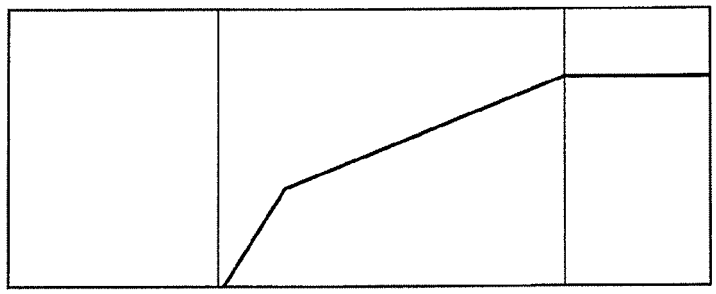

The resolution converting unit 107 halves the horizontal and vertical resolutions of tile data of an image newly input after timing T1 via the buffer 105. As a tile which is determined as that to be lossy-encoded, the data after resolution conversion stored in the buffer 105 is stored in the memory 111 via the selection unit 109, as shown in FIG. 9C. In this manner, the non-encoded data on the memory 111 are stored at a resolution of 1200 dpi, as shown in FIG. 9D, so that the data size can fall within the range that allows the lossy encoding processing within one page time period.

<When 4N (%)<lossy encoding ratio≦16N %>

This processing is executed when the lossy encoding ratio exceeds 4×N % during the lossless encoding processing of an image for one page, i.e., before completion of the lossless encoding processing of the image for one page.

When the lossy encoding ratio exceeds 4×N %, the control unit 150 controls the resolution converting unit 113 to execute resolution conversion again. It should be noted that the horizontal and vertical resolutions of non-encoded data stored in the memory 111 become ½ the original resolutions. Therefore, upon applying the resolution conversion by the resolution converting unit 113 again, the resolutions of the non-encoded data in the memory 111 become ¼ the original resolutions.

On the other hand, the control unit 150 instructs the resolution converting unit 107 to reduce the horizontal and vertical resolutions of newly input tile data to ¼, so as to execute resolution conversion of the tile data in the buffer 105. As a result, the resolution converting unit 107 reduces the horizontal and vertical resolutions of the newly input image data to ¼(600 dpi) via the buffer 105. As a tile determined as that to be lossy-encoded, 600-dpi data that has undergone the resolution conversion is stored in the memory 111. In this way, the non-encoded data size is reduced to 1/16 to allow the lossy encoding processing within one page time period.

Figure 10A:
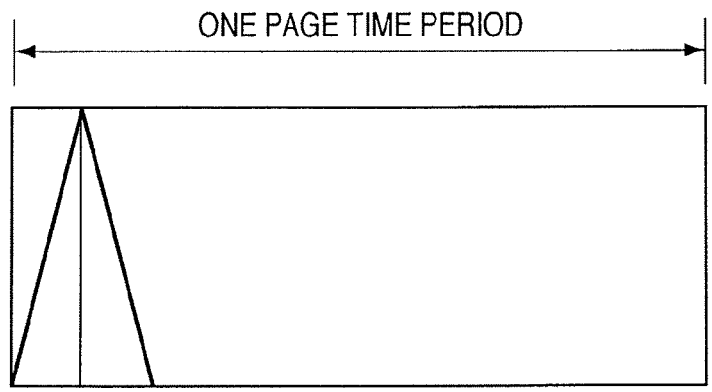
FIGS. 10A to 10C show an increase/decrease in non-encoded data of respective resolutions as a result of resolution conversion (twice)
Figure 10B:
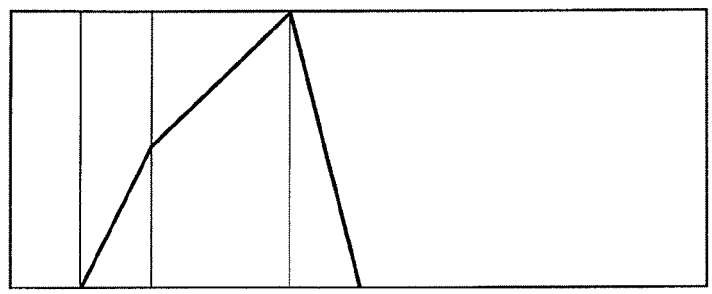
Figure 10C:
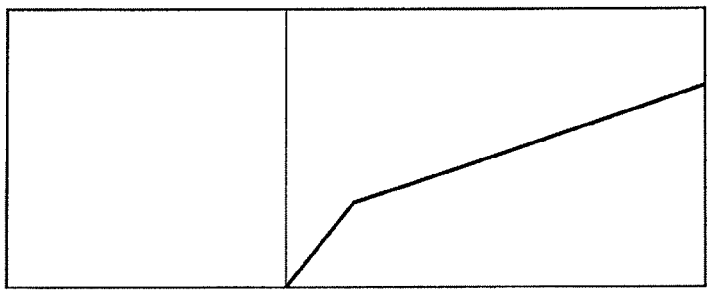

FIG. 10A shows an increase/decrease in 2400-dpi non-encoded data size on the memory 111, and FIG. 10B shows an increase/decrease in 1200-dpi non-encoded data size on the memory. The 1200-dpi data size begins to decrease at the start timing of the second resolution conversion processing. FIG. 10C shows 600-dpi non-encoded data stored in the memory 111. The 600-dpi non-encoded data are generated by the second resolution conversion processing and applying resolution conversion to input image data to 1/4.

Since this embodiment assumes the range of N=(1/16 to 1/14)×100%, examples in which the lossy encoding ratio exceeds 16N % are not shown. However, as can be easily understood from the above description, if the lossy encoding ratio exceeds 16N %, the third resolution conversion can be executed, and if it exceeds 64N %, the fourth resolution conversion can be executed.

In the above embodiment, the first resolution conversion halves the horizontal and vertical resolutions to reduce the non-encoded data size to 1/4. Alternatively, the first resolution conversion may halve either of the horizontal and vertical resolutions, and the second resolution conversion may halve the other resolution. In this case, the data size can be reduced to 1/2 by the first resolution conversion, and the non-encoded data size can be controlled more flexibly. In this case, the timings at which the lossy encoding ratio exceeds N, 2N, 4N, 8N, and 16N must be detected.

A detailed processing sequence (that of the control unit 150) of the encoding processing in the above embodiment will be described below using FIGS. 19 to 22. Assuming that the user can arbitrarily set the tile size under predetermined conditions, an extended translation of the above embodiment will be given. In the above embodiment, the lossy encoding unit 115 adopts JPEG encoding as its lossy encoding. Therefore, the tile size is an integer multiple of an 8×8 pixel size. However, for the sake of simplicity, assume that an input original tile size has $8 \times 2^i$ pixels in both the horizontal and vertical directions. Also, in the following description, some variables will appear, and they will be explained at the time of their appearance.

In step S1, the user determines a tile size. The tile size has $8 \times 2^i$ pixels in both the horizontal and vertical directions. The user sets this variable i or the tile size via an operation panel or the like (not shown). Note that i=2 in the aforementioned example.

The process advances to step S2 to substitute "1" in variable P used manage a page number so as to start encoding of the first page.

The process advances to step S3 to calculate the total number Tmax of tiles based on the numbers of pixels in the horizontal and vertical directions of image data to be encoded and the determined tile size. When a document image is scanned, the size of image data can be calculated based on the document size and the scan resolution (2400 dpi in this embodiment). Since an arrangement for detecting the original size is known to those who are skilled in the art, a description thereof will be omitted.

The process then advances to step S4 to determine thresholds Th( ) used to detect the resolution conversion timings. The total number Tmax of tiles is determined depending on variable i upon calculating the tile size, and respective thresholds are determined based on this total number of tiles.

$Th(0) \leftarrow (N/100) \times Tmax$ $Th(1) \leftarrow (N/100) \times 4 \times Tmax$ $Th(2) \leftarrow (N/100) \times 16 \times Tmax$ where N is the encoding capability value of the lossy encoding unit 115 for all image data, as described above.

The process advances to step S5 to initialize variables Tc, Ch, and Rr.

Variable Tc is used to manage the number of a tile of interest, and its initial value is "1". Variable Ch is used to manage the number of tiles determined as "lossy", and its initial value is "0". Variable Rr is used to manage the target resolution of the resolution converting unit 107, and its initial value is "1". The resolution converting unit 107 executes processing for reducing the tile size in the buffer 105 to 1/Rr in both the horizontal and vertical directions. Since the other resolution converting unit 113 always executes resolution conversion to 1/2, no variables are required to manage it. Variable K stores a value indicating the number of times of execution of the resolution conversion. The initial value of variable K is "0", and is also used as a variable for specifying one of the thresholds Th( ) to be described later.

With the above processes, the initialization processing for encoding of one page is completed. Then, encoding processing is executed in step S6 and subsequent steps.

It is checked in step S6 if variable P is larger than 2, i.e., if an image whose lossless encoding is about to start is the third or subsequent page.

As described above using FIG. 6, upon starting lossless encoding for the third or subsequent page, the lossy encoding unit 115 must complete lossy encoding processing for an image two pages before. This checking processing is done in step S7. If it is determined that lossy encoding two pages before is not complete yet, the process advances to step S8 to execute error processing.

If NO in step S6 or if YES in step S7, the process advances to step S9.

In step S9, the Tc-th tile data of the image data to be encoded is input. In step S10, the input tile data is stored in the buffer 105.

It is checked in step S11 if variable Rr="1". If Rr=1, since the need for the conversion processing of the resolution converting unit 107 can be obviated, the process jumps to step S13. On the other hand, if variable Rr≠"1", the process advances to step S12 to set 1/Rr in the resolution converting unit 107 and to control it to execute resolution conversion. The resolution conversion result by the resolution converting unit 107 is re-stored (overwritten) on the buffer 105.

In steps S13 and S14, the lossless encoding unit 101 executes lossless encoding processing of the tile data of interest, and calculates attribute information of that tile of interest.

It is checked in step S15 based on the calculated attribute information if lossless-encoded data of the tile of interest is adopted.

As described above, the attribute information is calculated from the number of colors, degree of change, histogram of pixel values, and the like of surrounding pixels with reference to the surrounding pixels upon lossless-encoding a pixel of interest in the lossless encoding processing.

A practical example of calculation of the attribute information will be described below.

As described above, the lossless encoding unit 101 adopts JPEG-LS, and the lossy encoding unit 115 adopts JPEG. Both these methods are entitled with "JPEG", but their encoding algorithms are quite different. These encoding processes themselves are known to those who are skilled in the art, but "JPEG" is encoding suited to natural images (especially, landscapes, portraits, and the like), and JPEG-LS is encoding suited to text and line images. Using these features, the attribute information may be calculated to allow to select lossless encoding for text/line images easily and to select lossy encoding for natural images easily.

The attribute information to be calculated may include:
the number of colors that appear in a tile;
the number of times of determination indicating that the density (or luminance) difference between two neighboring pixels in a tile is equal to or larger than a predetermined threshold;
the median or variance of a histogram generated to have the density (or luminance) difference between two neighboring pixels in a tile as the horizontal axis;
the generated lossless-encoded data length, etc.

The lossless-encoded data is adopted when the following conditions are met:

1. the number of colors that appear in a tile is equal to or smaller than a given threshold,
2. the number of times of determination indicating that the density (or luminance) difference between two neighboring pixels in a tile is equal to or larger than a predetermined threshold is equal to or larger than a given threshold,
3. the median of a histogram generated to have the density (or luminance) difference between two neighboring pixels in a tile as the horizontal axis is equal to or larger than a given threshold and the variance of that histogram is equal to or smaller than a given threshold, and
4. the generated lossless-encoded data length is equal to or smaller than a given threshold.

(Note that the above thresholds are desirably determined depending on the tile size).

In step S15, if all the above conditions 1 to 4 are met, "lossless" is determined for the tile of interest; if any of the above conditions are not met, "lossy" is determined.

Note that the types of attributes to be calculated and the lossless/lossy determination conditions are merely examples, and they do not limit the present invention. For example, if at least one of conditions 1 to 4 is met, "lossless" may be determined. Since lossless encoding can perfectly restore an original tile, it is desirable to increase the possibility of determination of "lossless" in terms of image quality, and the load on the lossy encoding unit 115 can be reduced.

If "lossless" is determined in step S15, the process advances to step S16, and the lossless-encoded data generated by the lossless encoding unit 101 is output to the memory 111. At this time, an identification bit indicating "lossless-encoded data" is stored in the header field of the encoded data.

On the other hand, if "lossy" is determined in step S15, the process advances to step S17 to output non-encoded data stored in the buffer 105 to the memory 111. At this time, a bit indicating "applying lossy encoding" is appended to the header field of that data. In step S18, variable Ch is incremented by "1". That is, the number of tiles determined as "lossy" is updated.

If the process advances to step S19, variable Ch and threshold Th(K) are compared. In the early stage of encoding for one page, since K=0, Th(K) Th(0)=(N/100)×Tmax.

That is, step S19 checks if the data size determined as "lossy encoding" is equal to or lower than the encoding capability value N of the lossy encoding unit 115 for an image for one page, and the lossy encoding unit 115 can execute encoding.

Therefore, if Ch≦Th(K), the process advances to step S23 without executing the processes in steps S20 to S22.

If Ch>Th(K), this means that non-encoded data more than the encoding capability value N of the lossy encoding unit 115 are stored in the memory 111. Then, the process advances to step S20 to instruct the resolution converting unit 113 to start resolution conversion processing, so as to apply resolution reduction processing to non-encoded data stored in the memory 111.

Also, as for a tile input after the tile of interest, the resolution converting unit 107 must execute resolution conversion. Hence, the process advances to step S21 to double Rr. Furthermore, in step S22 variable K is incremented by "1" since resolution conversion has been done.

In step S23, variable Tc and the total number Tmax of tiles are compared. That is, it is checked if the lossless encoding phase for one page is completed. If NO in step S23, variable Tc is incremented by "1" in step S24, and the process returns to step S9.

If it is determined in step S23 that the lossless encoding phase for one page is complete, the process advances to step S25 to control the lossy encoding unit 115 to start lossy encoding processing of non-encoded data stored in the memory 111 (to be described in detail later). Note that whether or not the lossy encoding processing is completed is not checked in this case.

After that, it is checked in step S26 if the next page to be encoded still remains. If it is determined that the next page still remains, variable P is incremented by "1" in step S27 to start the processing in step S3 and subsequent steps. On the other hand, if it is determined in step S26 that the next page does not remain, a series of lossless encoding processes end.

Figure 22:
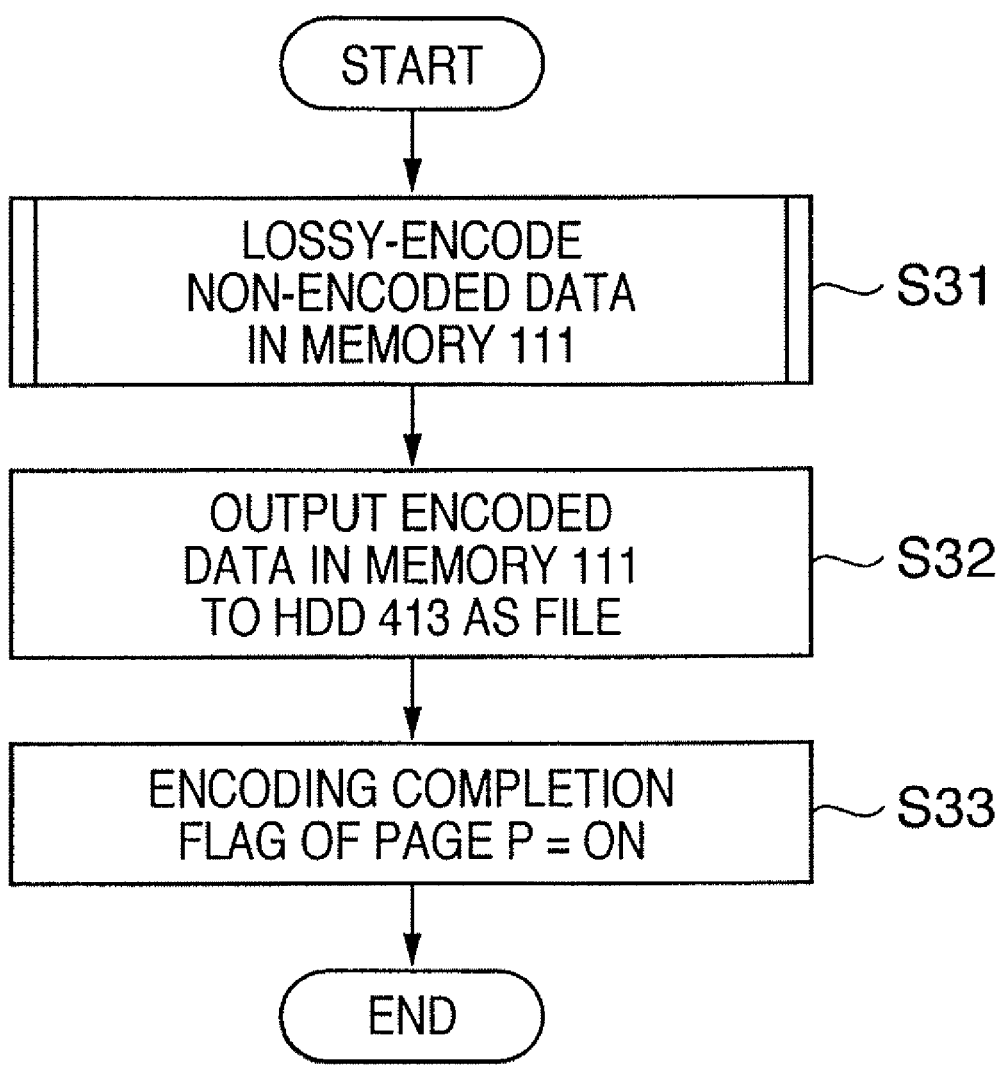
FIG. 22 is a flowchart for explaining the processing sequence of a lossy encoding phase in the first embodiment.

The processing of the lossy encoding unit 115 upon reception of the processing start instruction in step S25 will be described below with reference to the flowchart of FIG. 22.

In step S31, the lossy encoding unit 115 lossy-encodes all non-encoded data (which can be determined based on their identification bits) stored in the memory 111 upon reception of the lossy encoding start instruction. The lossy encoding unit 115 re-stores lossy-encoded data in which a bit indicating lossy encoding is appended to the header field in the memory 111. In this case, the lossy encoding unit 115 also executes processing for deleting non-encoded data as original data of the lossy-encoded data from the memory 111. As a result, the encoded data (including lossless-encoded data and lossy-encoded data together) of a page indicated by variable P are generated on the memory 111.

The process advances to step S32 to convert the encoded data in the memory 111 and to store the converted data in the HDD 413 as a file. Note that data indicating the number of times of resolution conversion to be applied to the lossy-encoded data is written in the file header.

After that, a flag indicating completion of the lossy encoding & file storage processing (lossy encoding phase) indicated by variable P is set ON in step S33. This flag is checked in step S7 described above.

As described above, according to this embodiment, the encoding processing can be done according to the timings shown in FIG. 6. Especially, even when the capability value N of the lossy encoding unit 115 is exceeded in the lossless encoding phase, the non-encoded data size can be reduced to be equal to or smaller than the capability value N of the lossy encoding unit 115 by resolution conversion.

In the above embodiment, error processing (interruption) is executed if NO is determined in step S7. However, if this embodiment is applied to, e.g., a copying machine, and delay of the scan timing of the next document is permitted, the control may wait until YES is determined in step S7. That is, if NO in step S7, the process may return to step S7 again.

Second Embodiment

Figure 2:
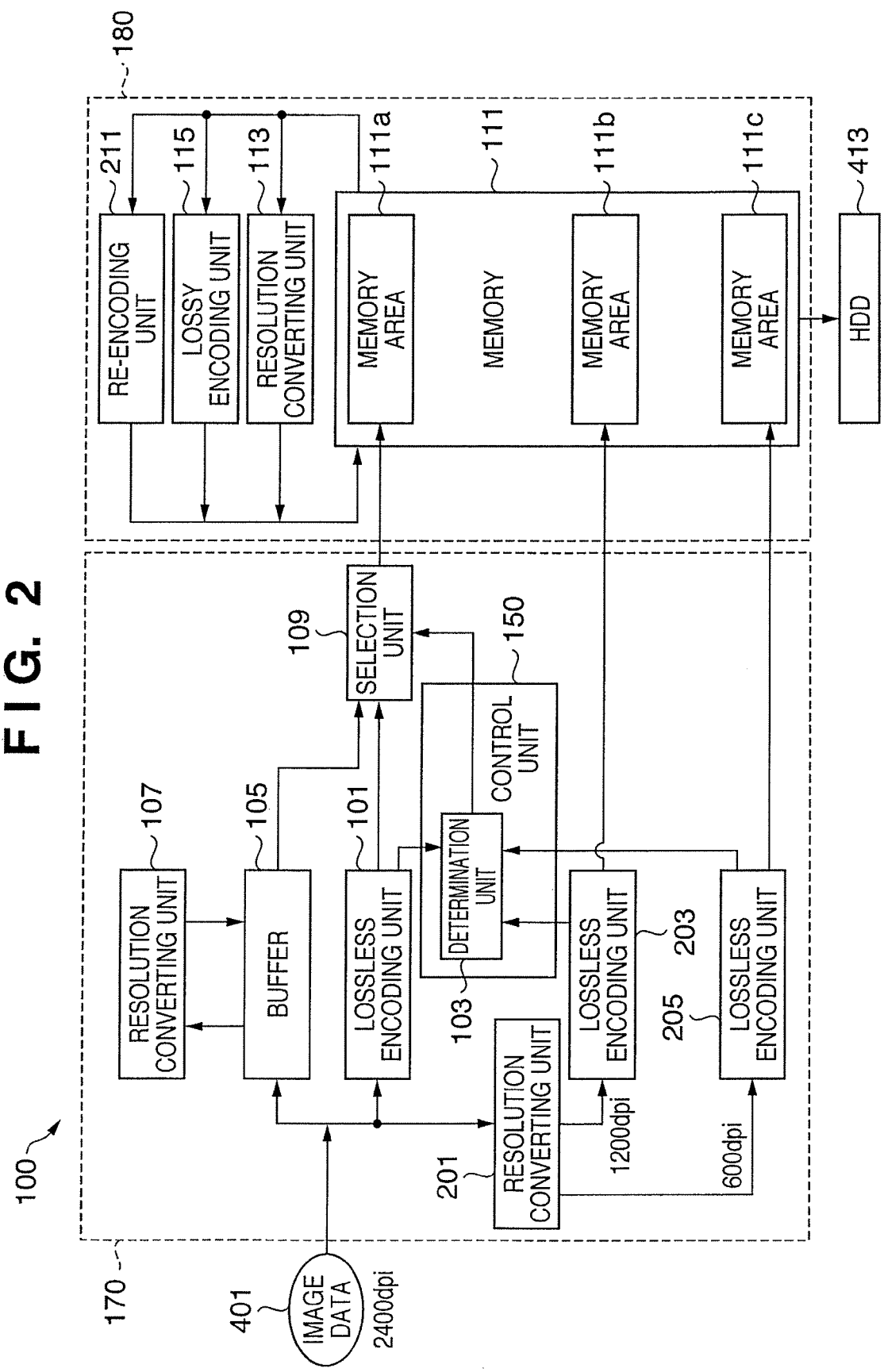
FIG. 2 is a block diagram of an image encoding apparatus according to the second embodiment.
Figure 11:
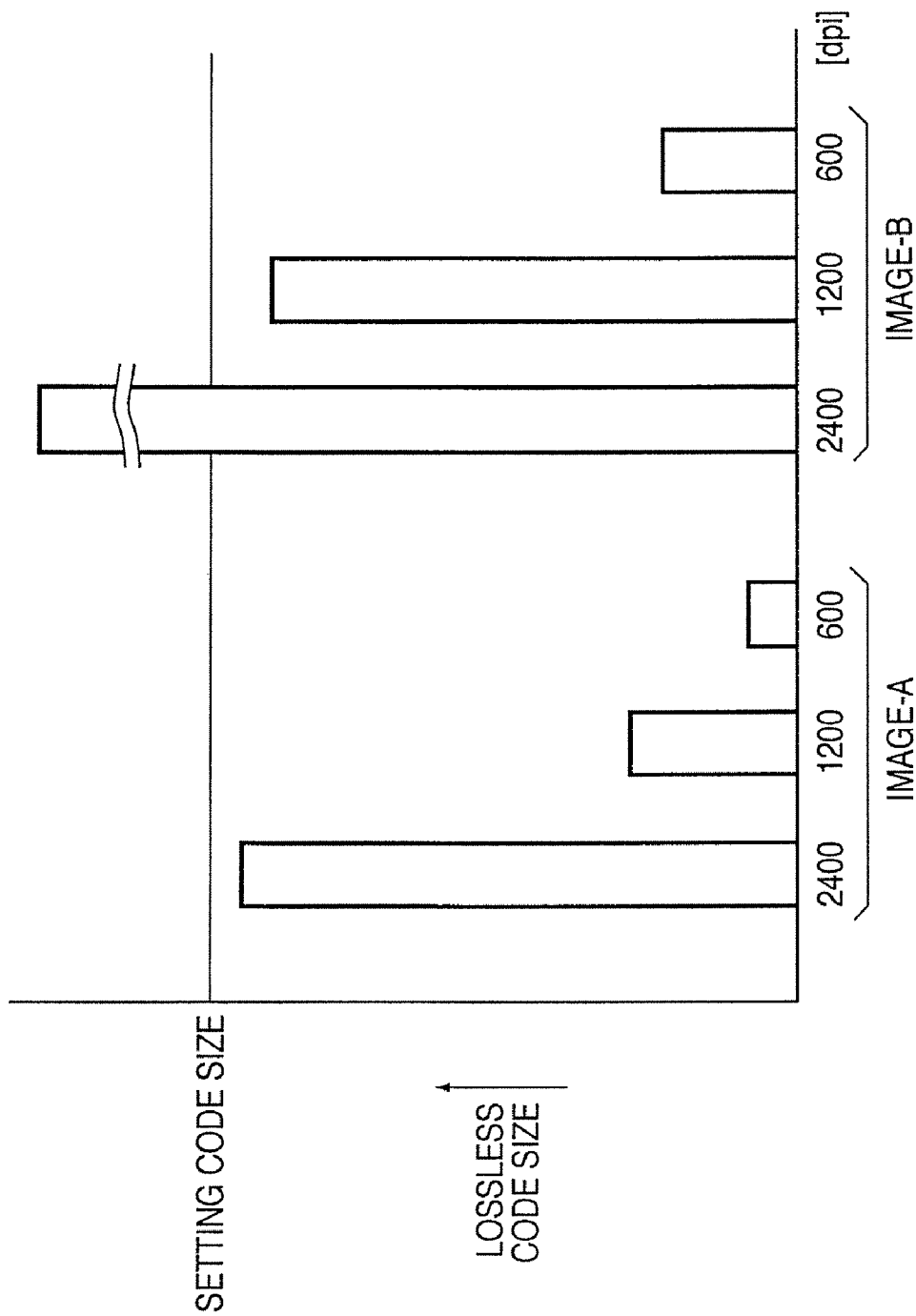
FIG. 11 shows lossless-encoded data sizes of a plurality of resolutions for two different types of images.

The second embodiment according to the present invention will be described hereinafter. FIG. 2 is a block diagram showing the basic arrangement of encoding processing according to the second embodiment. The operation of the encoding processing will be described below using FIGS. 11 and 12.

Note that the same reference numerals in FIG. 2 denote components having substantially the same functions as those in FIG. 1, and a description thereof will be omitted.

In the second embodiment, the encoded data size for one page falls within a predetermined setting code size based on the capability of the lossy encoding unit 115. To implement this, an arrangement for generating lossless-encoded data with different resolutions and a re-encoding unit for changing the compression ratio of lossy-encoded data are arranged. As a result, the code size can be adjusted finely.

A resolution converting unit 201 generates lossless-encoded data with different resolutions. The resolution converting unit 201 of this embodiment simultaneously generates, from input 2400-dpi tile data, tile data which have resolutions of 1200 dpi and 600 dpi, which are ½ and ¼ the resolution of the input tile data.

Lossless encoding units 203 and 205 respectively lossless-encode these image data with two different resolutions to generate lossless-encoded data, which are respectively stored in memory areas 111b and 111c. In FIG. 2, memory areas 111a, 111b, and 111c are assured on the memory 111. However, these memory areas may be independent memories.

Note that the size of a tile as an encoding unit of the lossless encoding unit 101 is 32×32 pixels, while that of lossless encoding unit 203 is 16×16 pixels, and that of the lossless encoding unit 205 is 8×8 pixels. In this way, the lossless encoding units 101, 203, and 205 process different sizes of tiles, but the number of tiles per page remains the same.

On the other hand, a re-encoding unit 211 is newly provided. This re-encoding unit 211 executes re-encoding processing of lossy-encoded data in the memory 111 in accordance with parameters which determine a compression encoding size. This re-encoding unit 211 decodes the lossy-encoded data to a level of quantized values or dequantized values, applies quantization again using a quantization step coarser than the previous step, and applies entropy-encoding again. In this manner, by changing the quantization step, a higher compression ratio is set to reduce the code size.

The processing contents of the second embodiment will be described below.

The lossless encoding phase within one page time period is substantially the same as that in the first embodiment, except that lossless encoding processing of the lossless encoding unit 203 using 16×16 pixels as one tile, and that of the lossless encoding unit 205 using 8×8 pixels as one tile are added.

Each of the lossless encoding units 101, 203, and 205 cumulatively counts the lossless-encoded data size for each tile. Therefore, the control unit 150 can detect the lossless-encoded data sizes for respective resolutions, which are stored in the memory areas 111a, 111b, and 111c of the memory 111 at the end timing of one page time period, and can also detect if lossless-encoded data of which resolution falls within the setting code size.

Assume that the memory area 111a stores no non-encoded data (data to be lossy-encoded). In this case, the control unit 150 can select lossless-encoded data of a maximum resolution, which falls within the setting code size (target code size), of those in the memory areas 111a, 111b, and 111c, and can output the selected data to the HDD 413. In case of an example shown in FIG. 11, the control unit 150 selects encoded data with a resolution of 2400 dpi for image A, and encoded data with a resolution of 1200 dpi for image B.

The processing executed when the memory area 111a stores non-encoded data to be lossy-encoded will be described below.

In this embodiment, the lossy encoding unit 115 and re-encoding unit 211 adopt JPEG encoding. The code size generated by the JPEG encoding processing basically depends on a quantization table Qi used upon quantizing coefficients after DCT transformation. For this reason, assume that the lossy encoding unit 115 holds, as a table, the relationship between a standard quantization table Q0 and quantization tables Q1, Q2, . . . having larger quantization steps than the standard quantization table, and statistically obtained encoded data sizes upon encoding using the respective quantization tables.

In general, if the quantization step value in a quantization table used upon lossy encoding is small, a decoded image has high image quality, bit its code size is large. Conversely, if a quantization table having a large quantization step value is used, the code size is reduced but image quality worsens.

In consideration of this point, the lossy-encoded data size is assured depending on the number of tiles determined as non-encoded data of an image within one page.

Let Mo be the setting code size. This setting code size is determined depending on the total number of pixels (or document size) of image data 401 to be encoded. Also, let Mok be a target lossless code size, and Moh be a target lossy code size. That is, the relation among these sizes is Mo=Mok+Moh.

Let Tck1 be the number of lossless-encoded tiles of encoded data stored in the memory area 111a upon completion of lossless encoding processing within one page time period, and M(Tck1) be its code size. Also, let Tch (of course, Tch≦(N/100)×Tmax) be the number of tiles of non-encoded data stored in the memory area 111a. Furthermore, let Tmax be the total number of tiles per page.

Also, let Tck2 be the number of tiles except for lossless-encoded data corresponding to the tile positions of non-encoded data stored in the memory area 111a of those in the memory area 111b, and M2(Tck2) be its code size. The number of tiles is the same as Tck1.

Likewise, let M3(Tck1) be a lossless code size of lower-resolution data corresponding to the tile positions of lossless-encoded data stored in the memory area 111a of those in the memory area 111c.

The target lossy code size Moh is calculated using a positive constant α which is set in advance (α may be appropriately set by the user) by:

$$Moh = Mo \times (Tch/Tmax) \times \alpha$$

That is, the target lossy code size is determined depending on the number Tch of tiles of non-encoded data in the total number Tmax of tiles. As a result, the target lossless code size Mok can be calculated by Mok=Mo−Moh.

A maximum lossless-encoded data size which does not exceed the target lossless code size Mok is determined from {M1(Tck1), M2(Tck1), M3(Tck1)}. This is equivalent to determination of the resolution.

Assume that a resolution of 2400 dpi is determined. The lossy-encoded data size per tile can be calculated by Moh/Tch. A quantization table Qi used to generate a code size which exceeds and is closest to Moh/Tch is determined. Then, the lossy encoding unit 115 actually executes lossy encoding processing of all non-encoded data stored in the memory area 111a.

Figure 12:
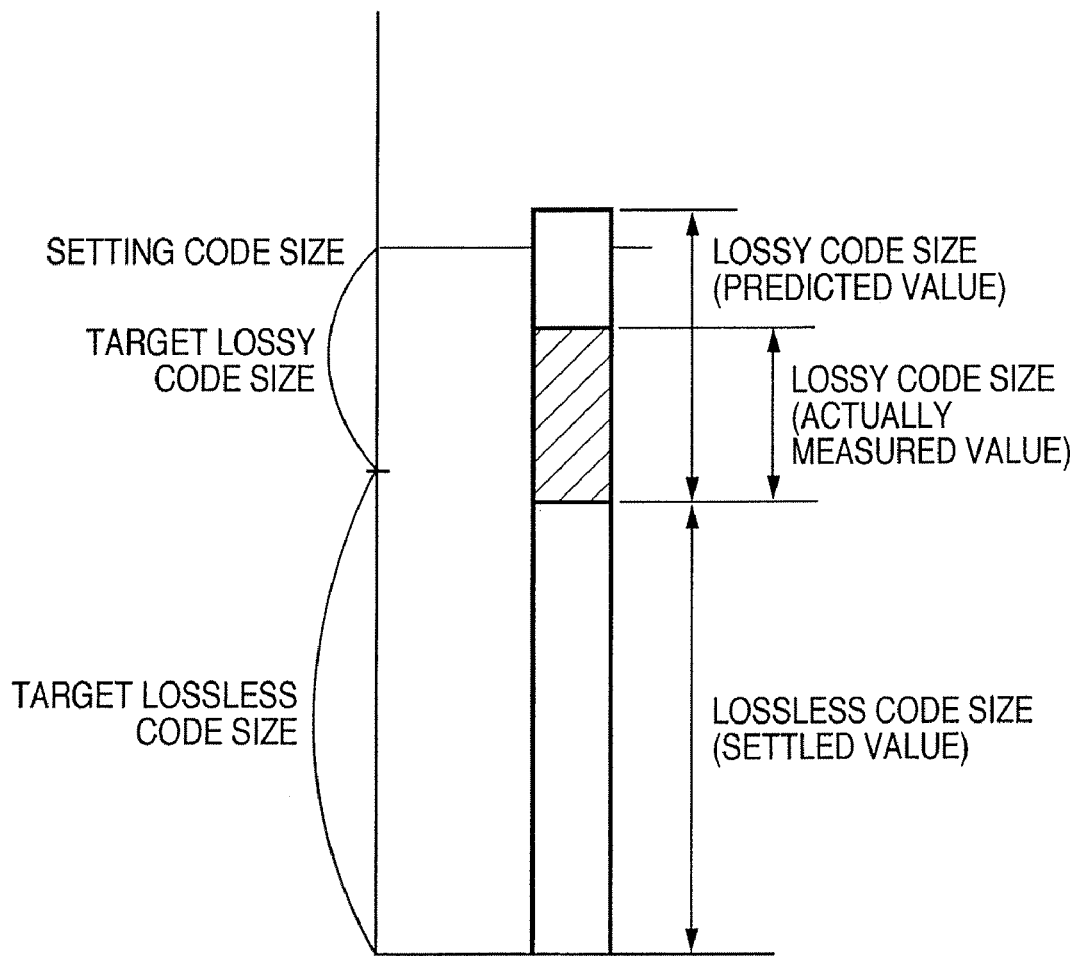
FIG. 12 shows a code size obtained by adding a lossy code size as a predicted value or actually measured value to a lossless code size.

An actual lossy code size is not determined unless data is actually encoded, but it assumes a size several ten percentages of the maximum value, and a value obtained by adding the lossless code size is more likely to be equal to or smaller than the setting code size. FIG. 12 shows such example.

The lossy-encoded data size generated by the lossy encoding unit 115 may often exceed Moh. In this case, a quantization table $Qi+1$ is set in the re-encoding unit 211 to execute re-encoding processing. The re-encoding unit 211 executes up to entropy decoding processing of lossy-encoded data to reclaim up to quantized data. That is, the re-encoding unit 211 does not execute inverse DCT processing. When the re-encoding unit 211 reclaims up to the quantized data, it executes processing for executing re-quantization using a ratio between quantization steps "$Qi+1/Qi$" so as to simultaneously execute dequantization using the quantization table Qi and quantization using the set quantization table $Qi+1$, then executing entropy encoding, and storing the encoded data in the memory area 111a again. The re-encoding unit 211 executes this processing for all lossy-encoded data generated using the quantization table Qi. Every time the generated lossy-encoded data size exceeds Moh, quantization tables $Qi+2$, $Qi+3$, ... are set in the re-encoding unit 211 to obtain lossy-encoded data whose size is equal to or smaller than Moh.

In this way, the lossless-encoded data in the memory area 111a and lossy-encoded data whose size is equal to or smaller than the target lossy code size Moh are connected in the order of tiles, and are stored as a file in the HDD 413.

On the other hand, assume that the determined resolution is 1200 dpi. That is, this is the case wherein it is determined that lossless-encoded data stored in the memory area 111a are adopted. In this case, lossless-encoded data corresponding to tiles of non-encoded data stored in the memory area 111a of those stored in the memory area 111b are deleted. The lossless-encoded data remaining in the memory area 111a and the lossy-encoded data whose size becomes equal to or smaller than the target lossy code size Moh are transferred in the order of tiles, and are stored as a file in the HDD 413.

The same applies to a case wherein the determined resolution is 600 dpi. In this case, lossless-encoded data corresponding to tiles of non-encoded data stored in the memory area 111a of those stored in the memory area 111b are deleted. The lossless-encoded data remaining in the memory area 111a and the lossy-encoded data whose size becomes equal to or smaller than the target lossy code size Moh are transferred in the order of tiles, and are stored as a file in the HDD 413.

In either case, the header of the file stored in the HDD 413 stores information associated with the resolution of the lossy-lossless-encoded data. Also, the file header stores a quantization matrix table used upon generating lossy-encoded data or information used to specify that table.

As described above, an output file is generated using the lossless-encoded data of the determined resolution and the lossy-encoded data, and is stored in the HDD 413. In case of the second embodiment, since lossless encoding and lossy encoding have the same resolution, the file header need only store information 1, ½, ¼, ... ) indicating how much the resolution is decreased with respect to the original resolution.

In the second embodiment, in the lossy encoding phase, since the processing of the re-encoding unit 211 is added to that of the lossy encoding unit 115, the required processing time may increase. That is, the required processing time may exceed one page time period. To solve this problem, the capability value N of the lossy encoding unit 115 is set to be smaller than that of the first embodiment to have an enough margin.

According to the second embodiment, the following variations are available.

1. <Arrangement without Re-Encoding Unit of Lossy Encoding>

In this arrangement, the resolution of lossless-encoded data is determined so that the sum of the lossy code size estimated from the non-encoded data size and the lossless code size becomes smaller than the setting code size. In this case, the actual code size (code size after lossy encoding) may become considerably smaller than the setting code size.

2. <Arrangement that Includes no Re-Encoding Unit of Lossy Encoding but in which Lossy Encoding Unit Generates Two Types of Encoded Data with Different Compression Ratios>

In this case, lossy-encoded data with a higher compression ratio can be interpreted as that after re-encoding, and if the setting code size is exceeded using lossy-encoded data with a lower compression ratio, the lossy-encoded data with a higher compression ratio may be adopted.

Third Embodiment

Figure 3:
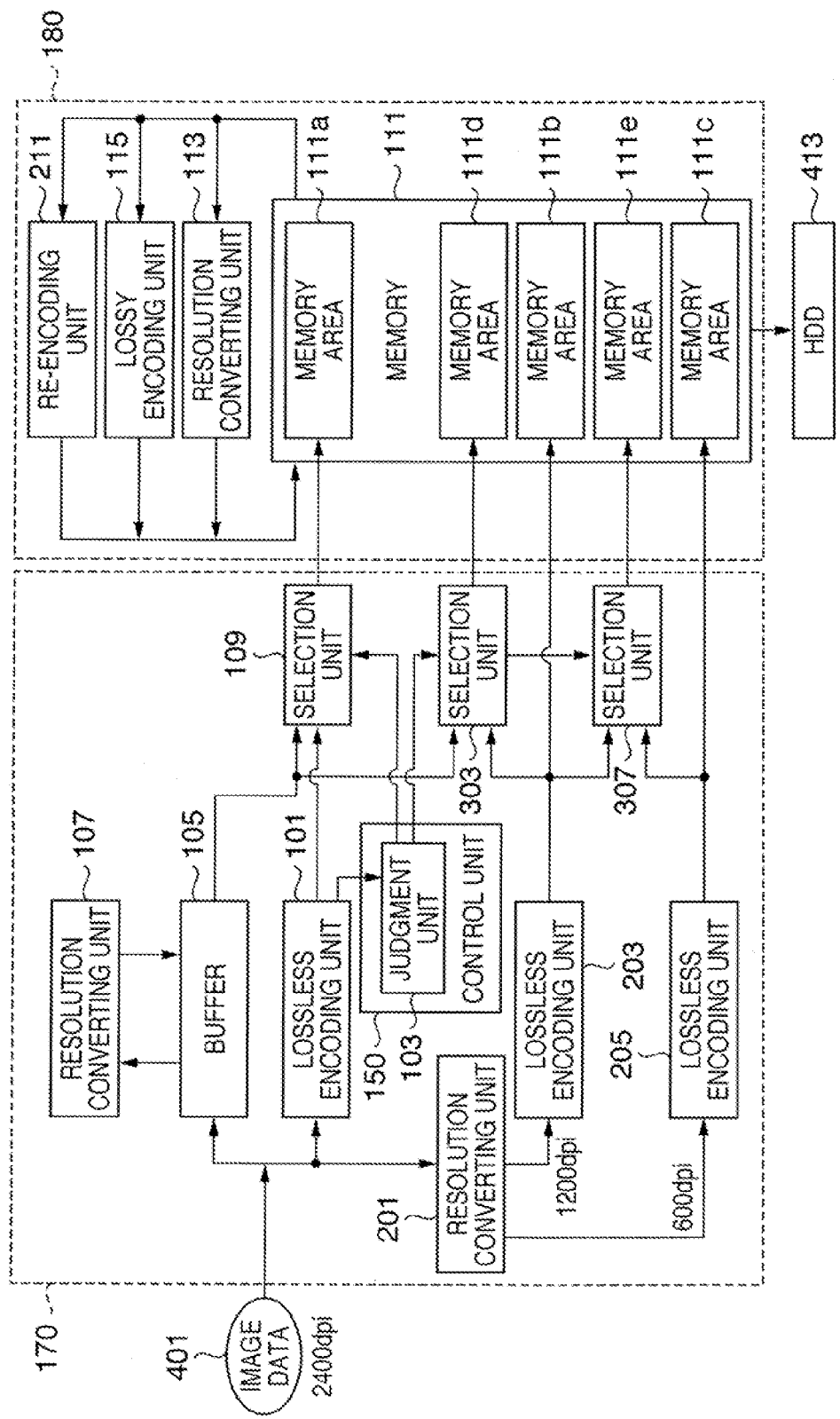
FIG. 3 is a block diagram of an image encoding apparatus according to the third embodiment.
Figure 4:
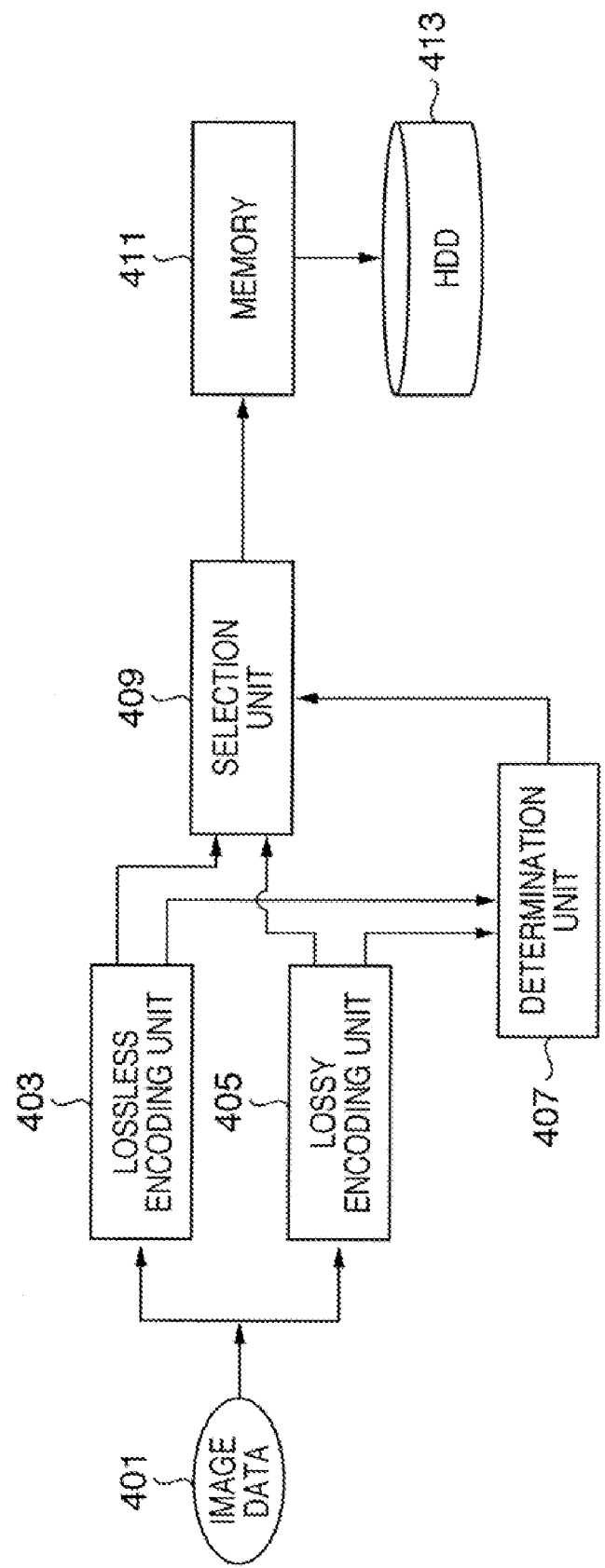
FIG. 4 is a block diagram showing an example of the arrangement of a conventional image processing apparatus.
Figure 5:
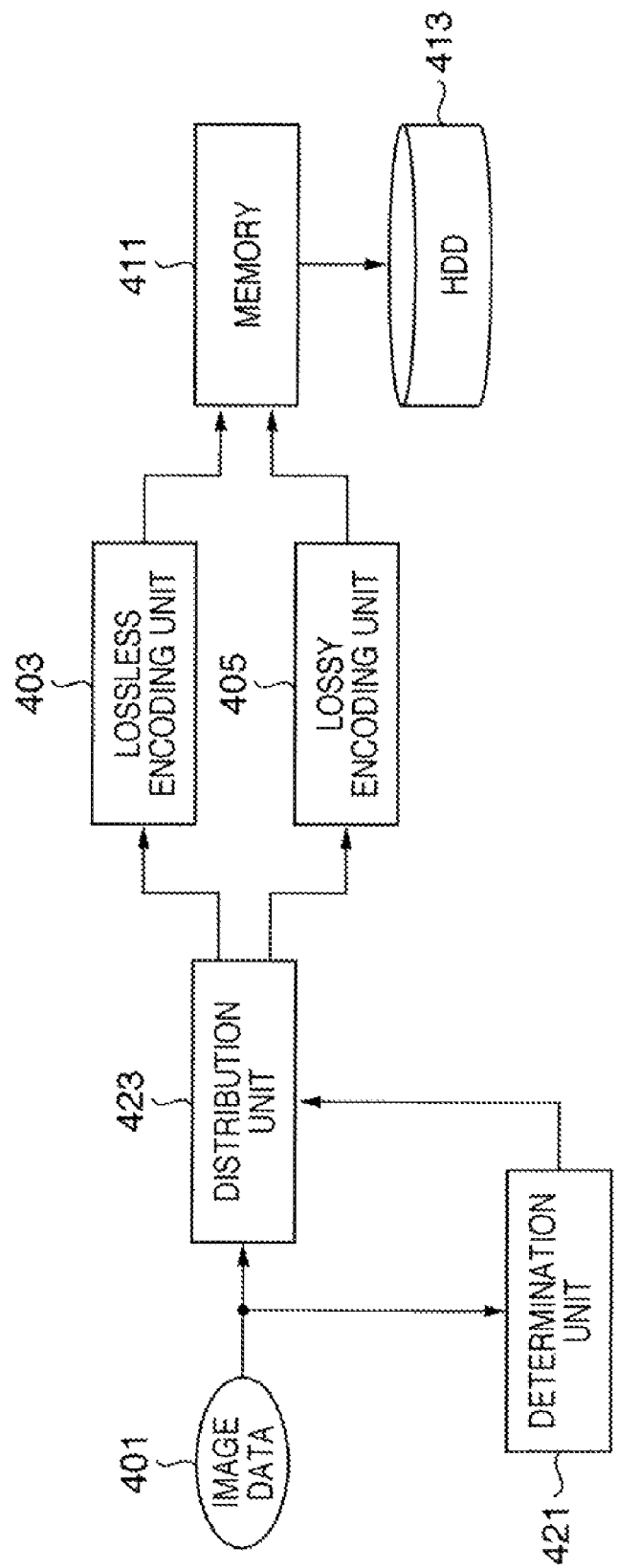
FIG. 5 is a block diagram showing another example of the arrangement of a conventional image processing apparatus.

The third embodiment will be described below. FIG. 3 is a block diagram showing the basic arrangement of the third embodiment, and the operation of the third embodiment will be described hereinafter using FIG. 13.

The third embodiment has substantially the same arrangement as that of the second embodiment, except that selection units 303 and 307, and memory areas 111d and 111e for storing encoded data output from these selection units are added to the arrangement of the second embodiment.

In the first and second embodiments, tile images to be lossless-encoded are not classified finely any more. In this embodiment, tile images to be lossless-encoded are classified based on, e.g., the numbers of tone levels, and can be handled in different resolutions.

In an image which includes character edge information as main information like a binary text image, the resolution is very significant. On the other hand, in a graphics image having a large number of tone levels, since the tone levels also take on a major significance as information, the weight of edge information relatively lowers, and the significance of the resolution is not so high rather than the binary text image.

Therefore, lossless-encoded image data can be classified into a region of an image which has a high significance of the resolution (H image region), and a region of an image which has a low significance of the resolution (L image region). The determination unit 103 makes this classification for respective tiles. The determination unit 103 receives image attribute information such as the number of tone levels and the like required for this classification from the lossless encoding unit 101.

The selection units 303 and 307 select lossless-encoded data with a higher resolution in the H image region and that with a lower resolution in the L image region, and store them in the memory areas 111d and 111e, respectively. Note that the header of each lossless-encoded data stores a bit indicating "lossless" and a bit indicating resolution information.

As a result, the memory area 111d stores lossless-encoded data of H image of 2400 dpi and L image of 1200 dpi, and the memory area 111e stores lossless-encoded data of H image of 1200 dpi and L image of 600 dpi.

Figure 13:
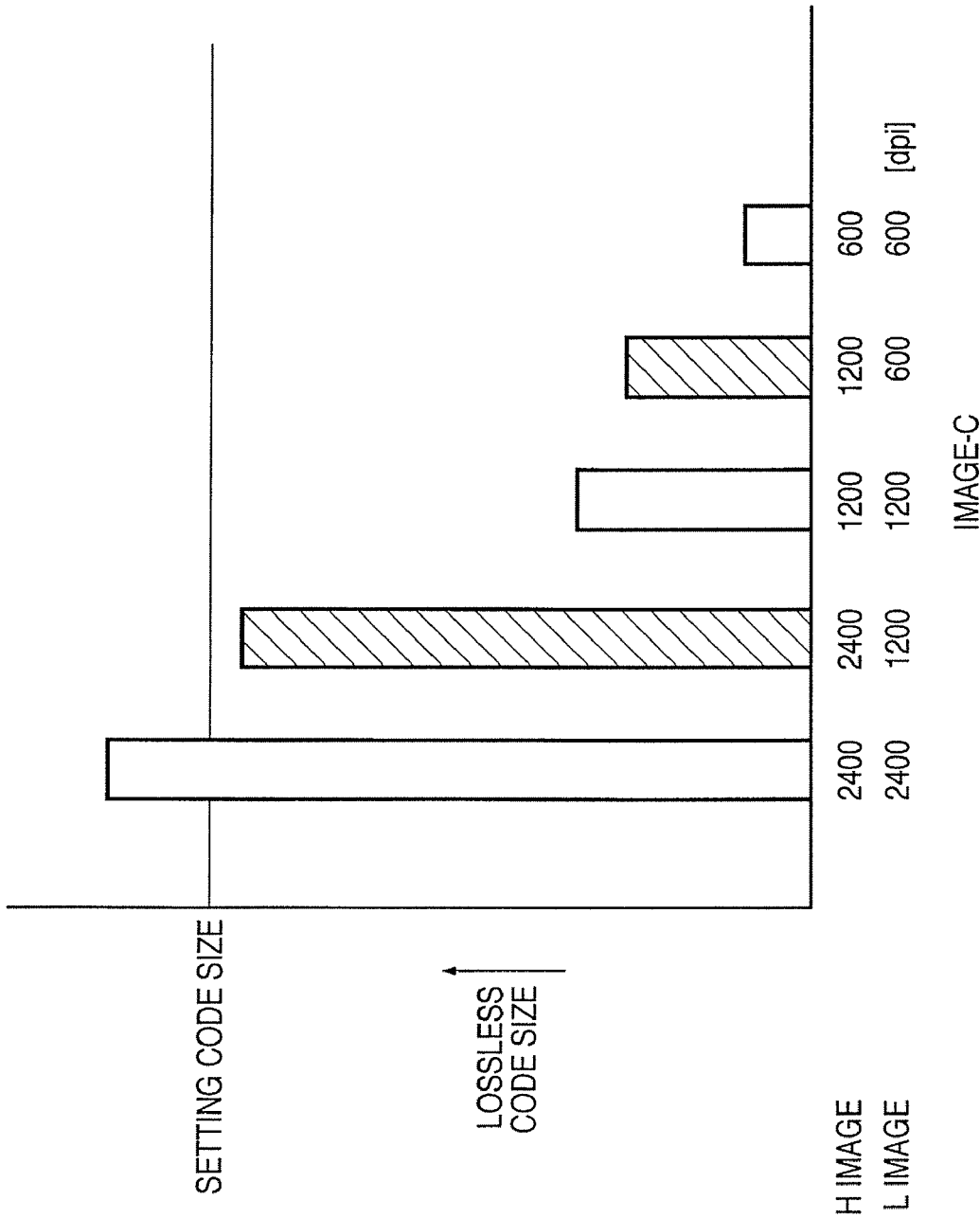
FIG. 13 shows lossless-encoded data sizes of a plurality of resolutions according to the third embodiment.

FIG. 13 shows an example of a graph which represents the lossless-encoded data size including different resolutions described above, and the lossless-encoded data size with the same resolution. If there is no non-encoded data to be lossy-encoded, lossless-encoded data with a maximum resolution, whose size can fall within the setting code size are selected to generate encoded data. In case of the example shown in FIG. 13, encoded data in which the resolution of H image is 2400 dpi and that of L image is 1200 dpi are selected.

If there are non-encoded data to be lossy-encoded, the lossless-encoded data in which memory area is to be adopted is determined in accordance with the occupation ratio of these non-encoded data. However, in the third embodiment, since one output file includes encoded data with different resolutions, an identification bit of lossless/lossy, and a bit indicating a resolution are appended to each tile header. Since other control methods are the same as the second embodiment, a description thereof will be omitted.

Fourth Embodiment

Figure 14:
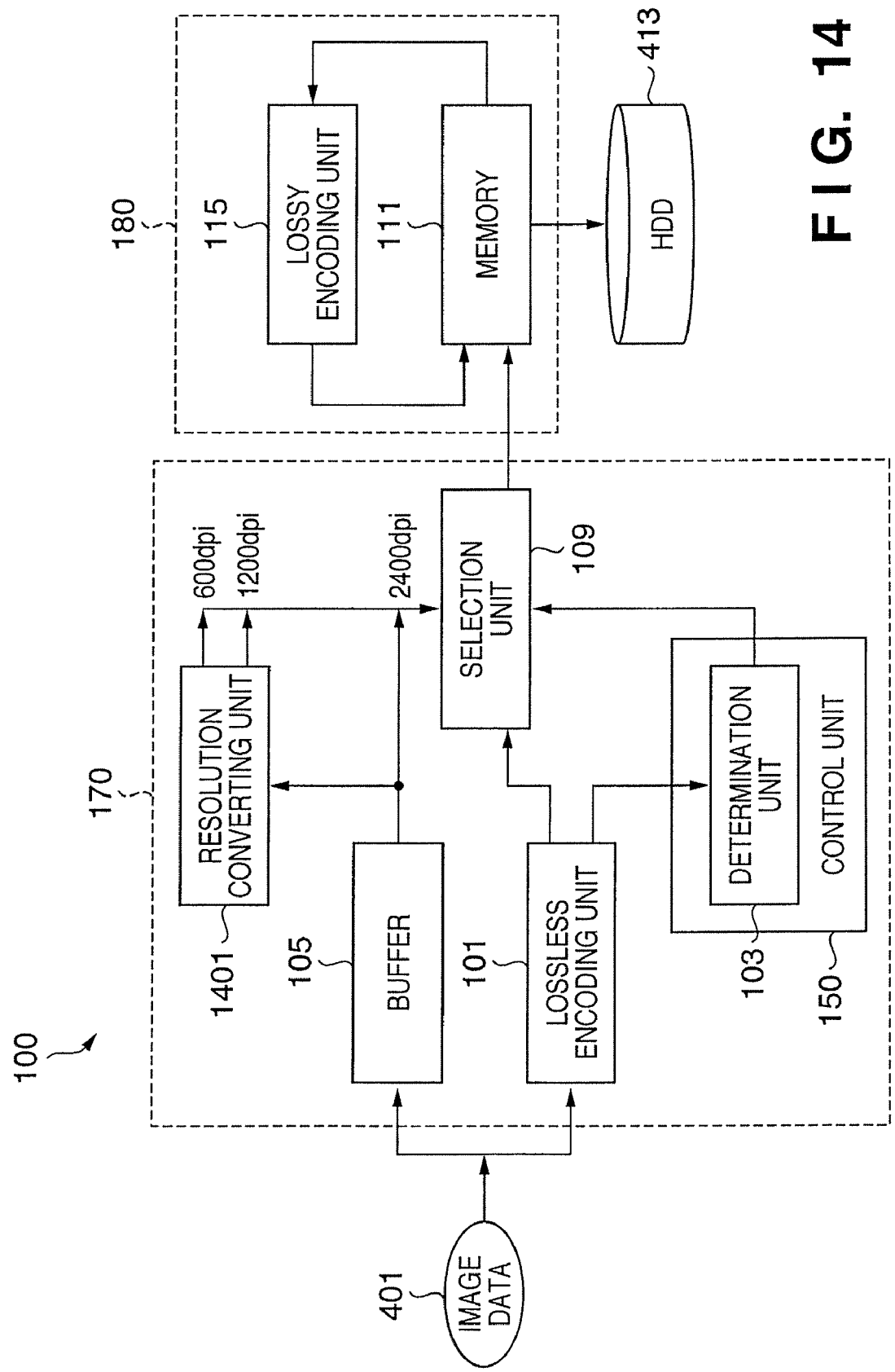
FIG. 14 is a block diagram of an image encoding apparatus according to the fourth embodiment.

The fourth embodiment according to the present invention will be described below. FIG. 14 is a block diagram showing the basic arrangement of an apparatus according to the fourth embodiment.

The fourth embodiment does not execute resolution conversion of data stored as non-encoded data in the memory 111. For this reason, this embodiment does not require the resolution converting unit 113 in FIG. 1.

Instead, this embodiment comprises a resolution converting unit 1401 which simultaneously generates data having resolutions of 1200 dpi and 600 dpi by resolution conversion from 2400-dpi tile data stored in the buffer 105. Image data having a size of 32×32 pixels at the resolution of 2400 dpi, that having a size of 16×16 pixels at the resolution of 1200 dpi, and that having a size of 8×8 pixels at 600 dpi are supplied to the selection unit 109.

When the determination result of the determination unit 103 is "lossy", non-encoded data of a total of three different resolutions, i.e., 2400-dpi tile data output from the buffer 105 and 1200- and 600-dpi data generated by resolution conversion are stored in the memory 111.

Figure 15:
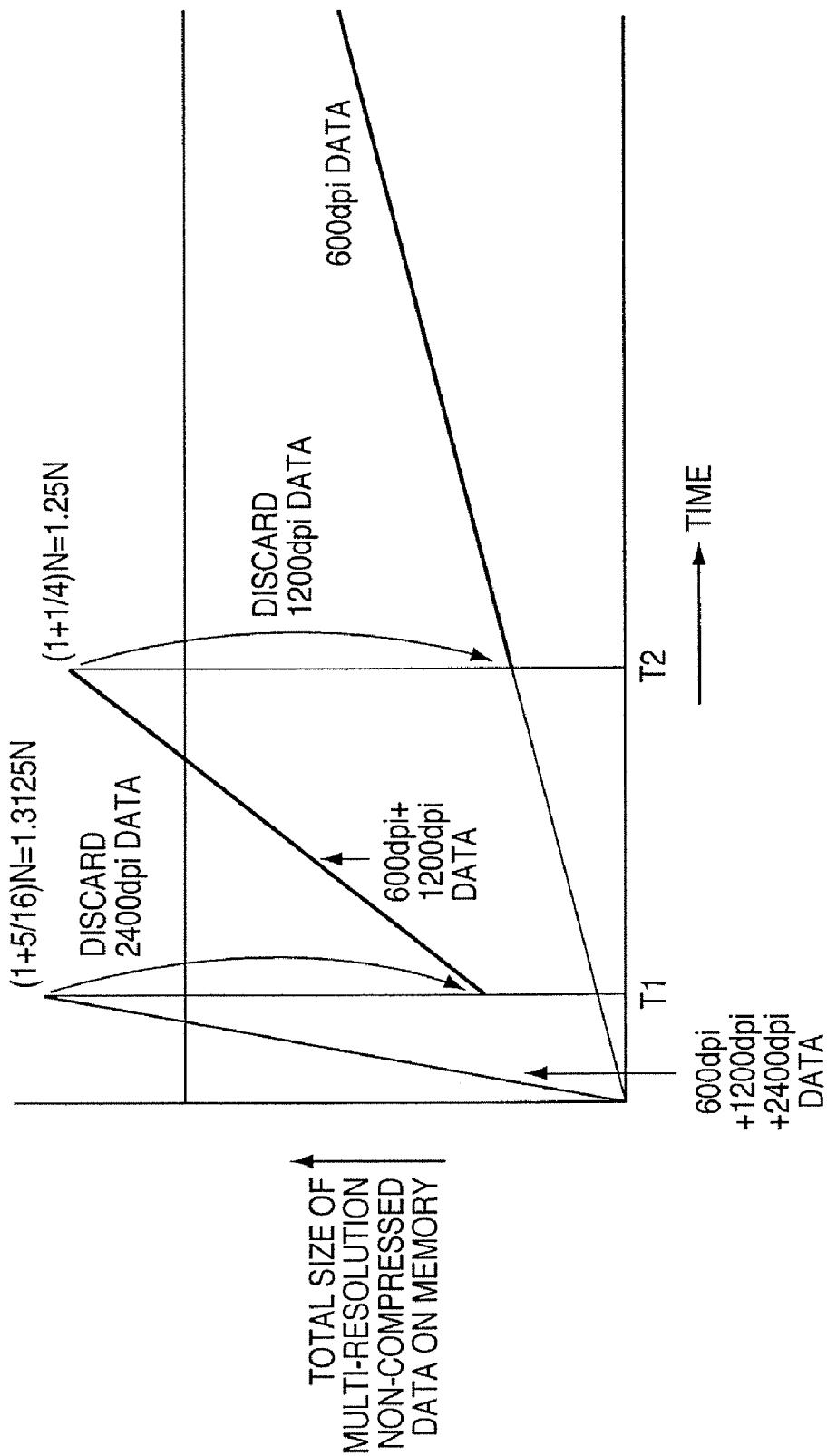
FIG. 15 shows transition of increases in non-encoded data size of respective resolutions on a memory.

The graph shown in FIG. 15 expresses how to store non-encoded data of the three different resolutions in the memory 111 within one page time period when the determination result of the determination unit 103 is "lossy" and continues. Data of respective resolutions are sequentially stored at a ratio proportional to the squares of resolutions, i.e., 16:4:1.

When the 2400-dpi non-encoded data size reaches N, the 1200- and 600-dpi non-encoded data sizes are respectively N/4 and N/16, and the total data size becomes $(1+5/16)N$. Therefore, the memory for storing non-encoded data requires a capacity larger by 5N/16 than the first embodiment.

When the 2400-dpi non-encoded data size exceeds N, since data of this resolution cannot be lossy-encoded within a predetermined period of time, these data are discarded (deleted) from the memory 111. Time T1 in FIG. 15 indicates this timing. At this time, the non-encoded data size stored in the memory is reduced from $(1+5/16)N$ to 5N/16 at once. If one page time periods ends before T1, non-encoded data having the resolution of 2400 dpi can be lossy-encoded.

When the 2400-dpi non-encoded data are discarded at T1, non-encoded data having the resolutions of 1200 dpi and 600 dpi remain. After that, if the "loss" determination result further continues, the non-encoded data sizes of the two different resolutions increase at a ratio of 4:1.

If the 1200-dpi non-encoded data size reaches N, the non-encoded data size of the resolution of 600 dpi becomes N/4, and the total data size becomes $(1+1/4)N=1.25N$.

As in the case of 2400-dpi data, if the 1200-dpi non-encoded data size exceeds N, since data of this resolution cannot be lossy-encoded within a predetermined period of time, these 1200-dpi non-encoded data are discarded from the memory 111. Time T2 in FIG. 15 indicates this timing. After T2, only 600-dpi non-encoded data are stored.

In this manner, the resolution is switched from 2400 dpi to 1200 dpi and to 600 dpi, and non-encoded data of the resolution which is no longer required are discarded.

As can be seen from the above description, when non-encoded data of a plurality of resolutions exist on the memory 111 even after one page time period, the lossy encoding unit 115 executes encoding processing of non-encoded data of the highest resolution of those.

Since the fourth embodiment does not execute resolution conversion of data stored as non-encoded data in the memory 111, the need for complicated control associated with the resolution conversion can be obviated and the control can be simplified, but a memory size required to store non-encoded data increases slightly.

Assume that the 2400-dpi non-encoded data size upon switching the resolution from 2400 dpi to 1200 dpi is slightly decreased from N to 20N/21. Since a peak of the non-encoded data size is $(1+5/16)N×20/21=1.25N$, it assumes the same value as the peak at time T2. Therefore, an increase in memory size can be suppressed to N/4.

The embodiments of the encoding apparatus according to the present invention have been described.

Decoding apparatuses corresponding to the above embodiments will be described hereinafter.

<Decoding Apparatus Corresponding to First Embodiment>

Figure 16:
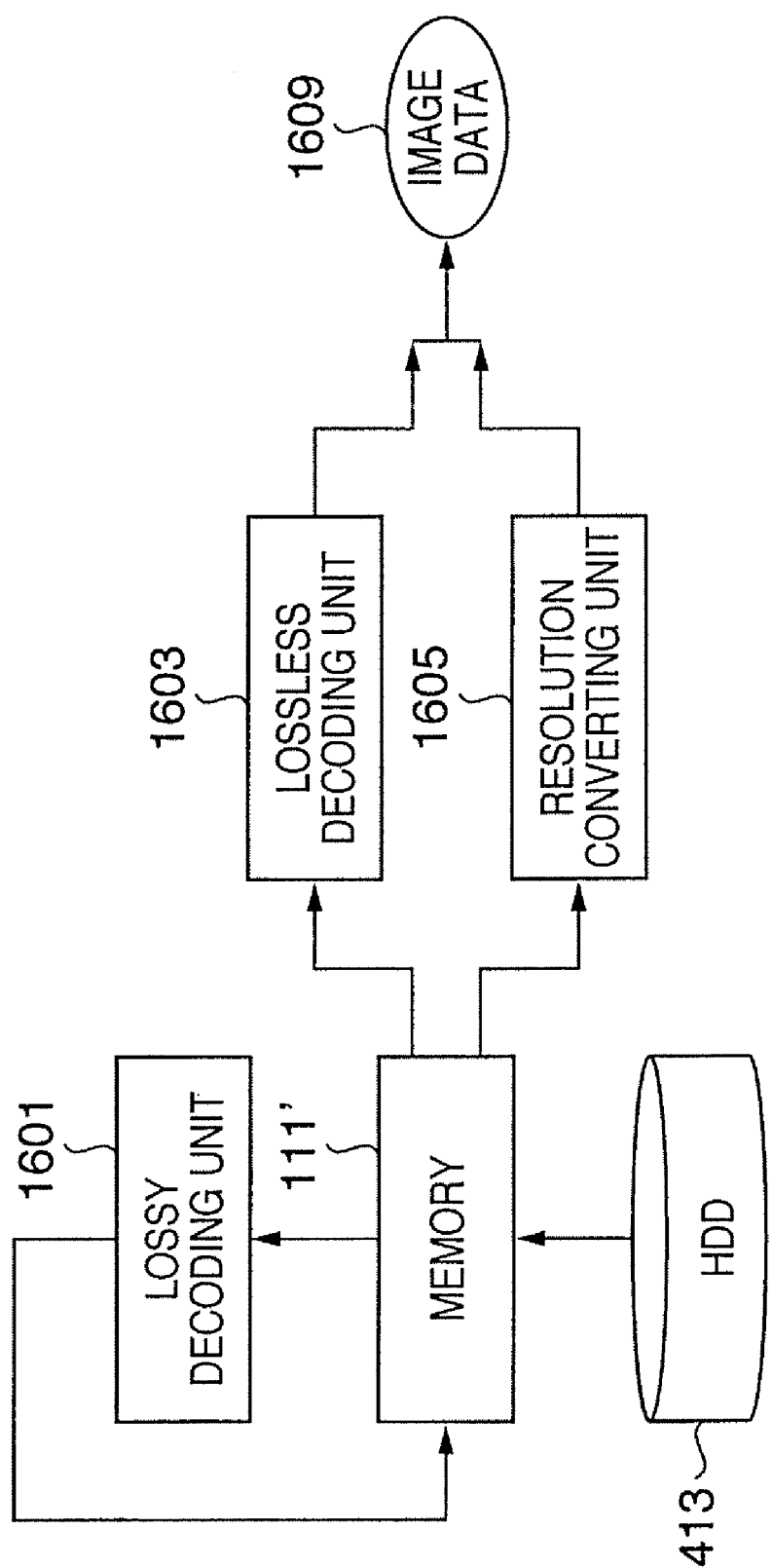
FIG. 16 is a block diagram of an apparatus for decoding encoded data obtained by the first embodiment.
Figure 18:
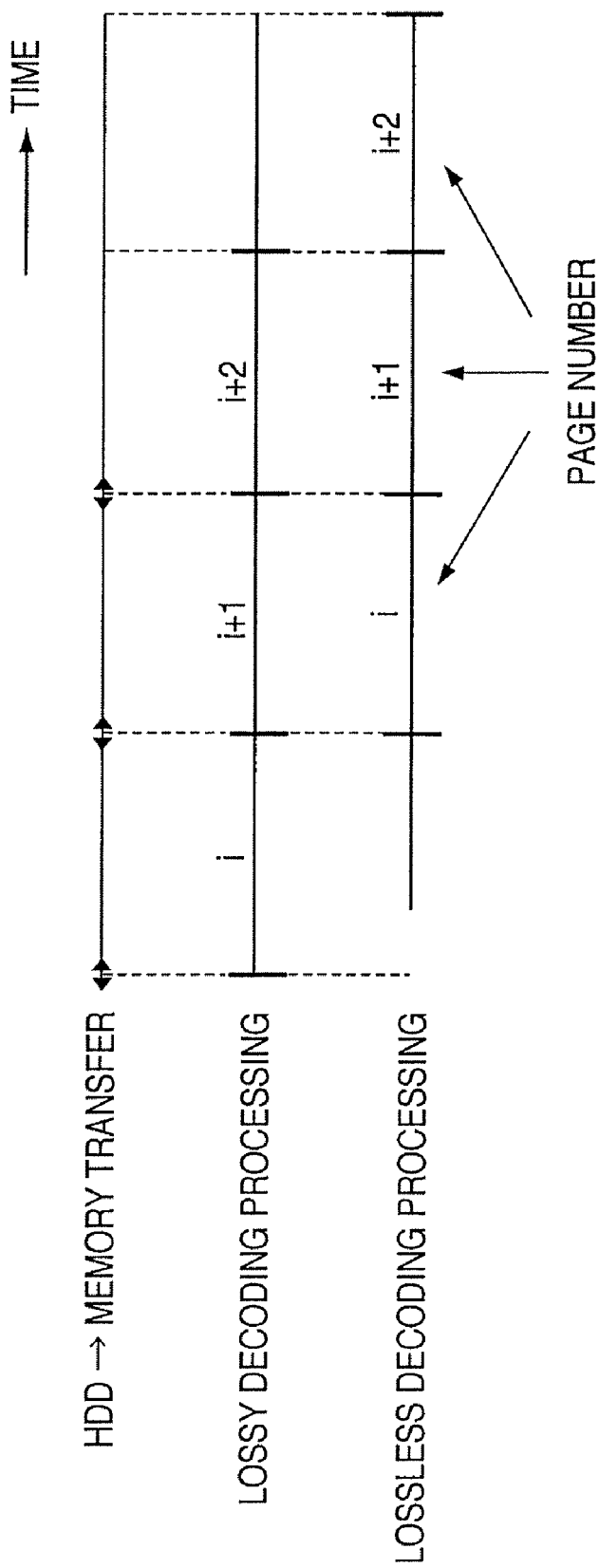
FIG. 18 is a timing chart of decoding processing.
Figure 19:
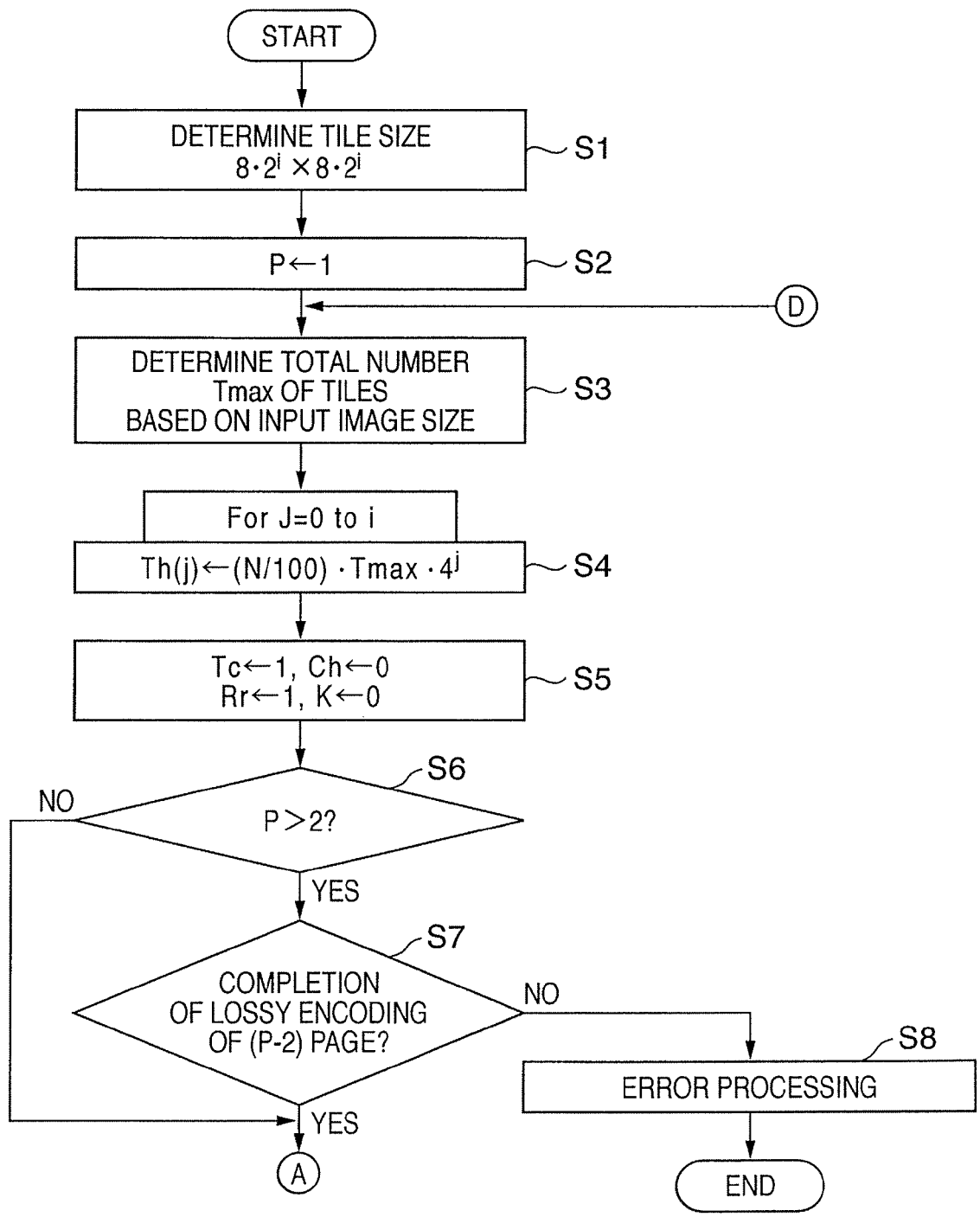
FIG. 19 is a flowchart for explaining the processing sequence of a lossless encoding phase in the first embodiment.
Figure 20:
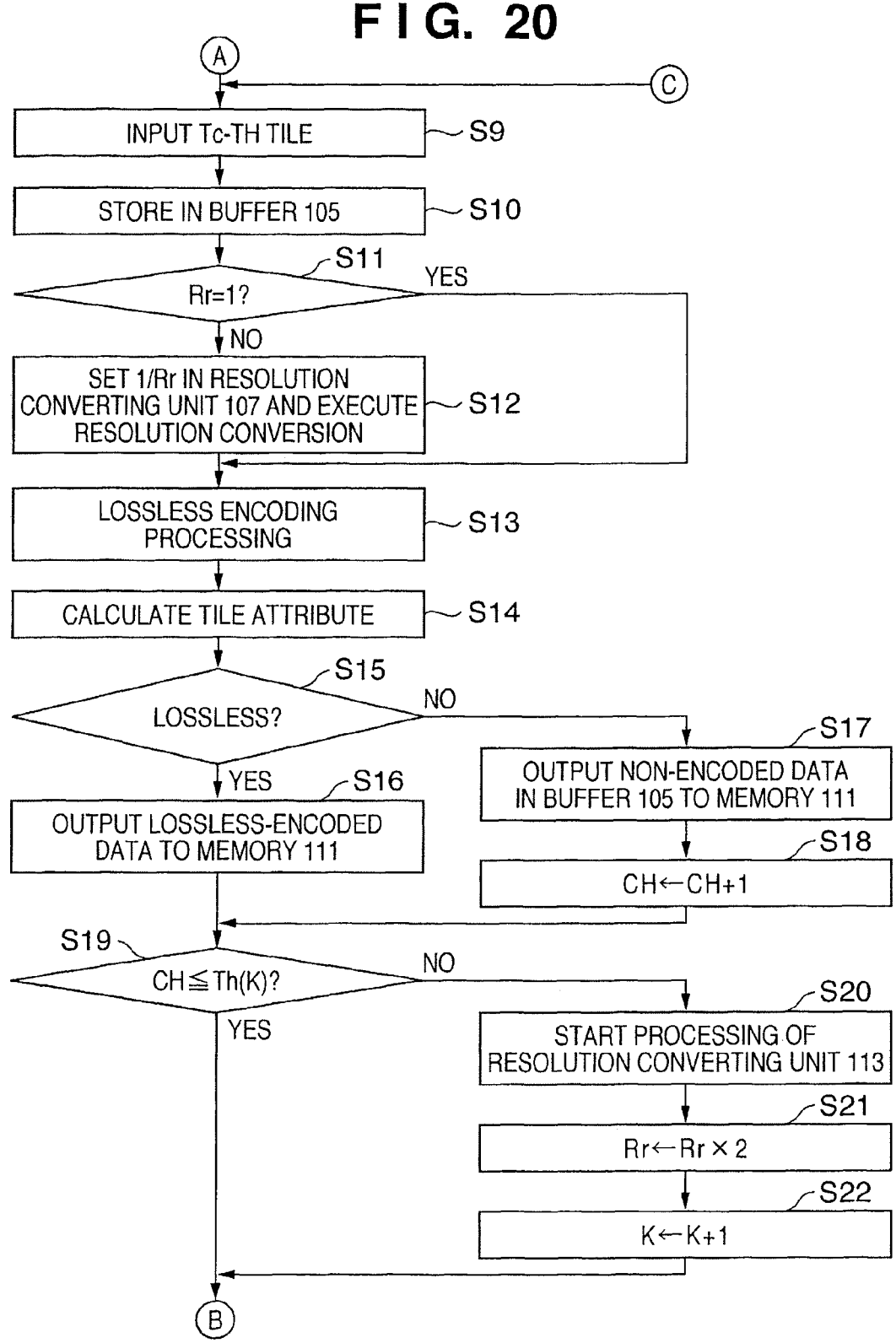
FIG. 20 is a flowchart for explaining the processing sequence of the lossless encoding phase in the first embodiment.
Figure 21:
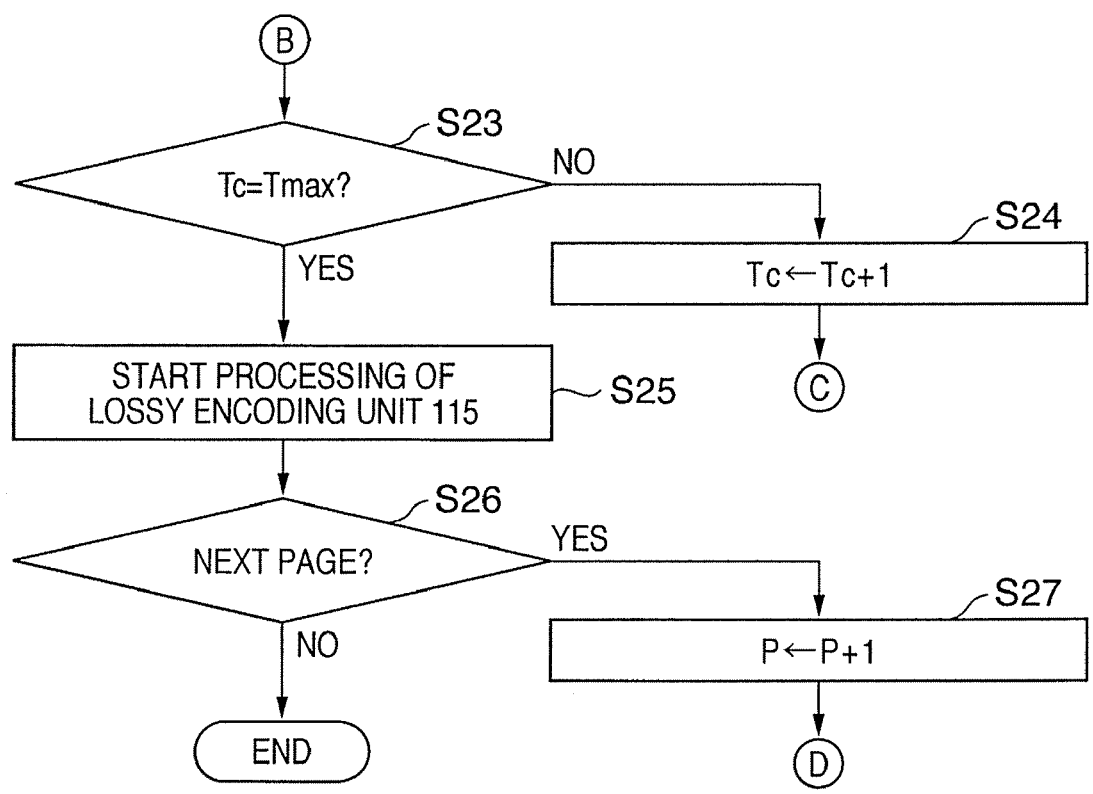
FIG. 21 is a flowchart for explaining the processing sequence of the lossless encoding phase in the first embodiment.

FIG. 16 is a block diagram of an apparatus for decoding encoded data generated by the image processing apparatus of the first embodiment. FIG. 16 will be described below using the timing chart of decoding processing shown in FIG. 18.

As in the encoding processing which requires two page time periods, the decoding processing requires two page time periods.

Encoded data stored in the hard disk drive 413 is transferred to a memory 111' for each page. This encoded data includes those which are lossless- or lossy-encoded for respective tiles. A file header also stores information indicating the number of times of resolution conversion upon generating lossy-encoded data.

During the first page time period, a lossy decoding unit 1601 executes decoding processing of lossy-encoded data for respective tiles, and stores them in the memory 111' again.

This lossy decoding unit 1601 requires a processing capability of N % or more, and a memory size N % of the image data size for one page is required to store decoded non-encoded data.

During the second page time period, a lossless decoding unit 1603 executes decoding processing of lossless-encoded data for respective tiles, and outputs them as image data 1609.

Also, the lossy-decoded tile data require conversion for increasing the resolution by the number of times of resolution conversion. For example, when the file header stores information indicating that the resolution conversion is executed twice, a resolution converting unit 1605 enlarges the number of pixels of the image obtained by the lossy decoding unit 1601 to $2^2=4$ times in both the horizontal and vertical directions. The enlargement processing may be attained by repeating one decoded pixel by 4×4 pixels, or increasing the number of pixels by linearly interpolating neighboring decoded pixels. When the number of times of resolution conversion is zero, i.e., when the resolution of the lossy-encoded data is 2400 dpi, the resolution converting unit 1605 outputs the input data intact without any processing.

With the aforementioned decoding processing, the encoded data generated by the first embodiment can be decoded to original data.

<Decoding Apparatus Corresponding to Second to Fourth Embodiments>

Figure 17:
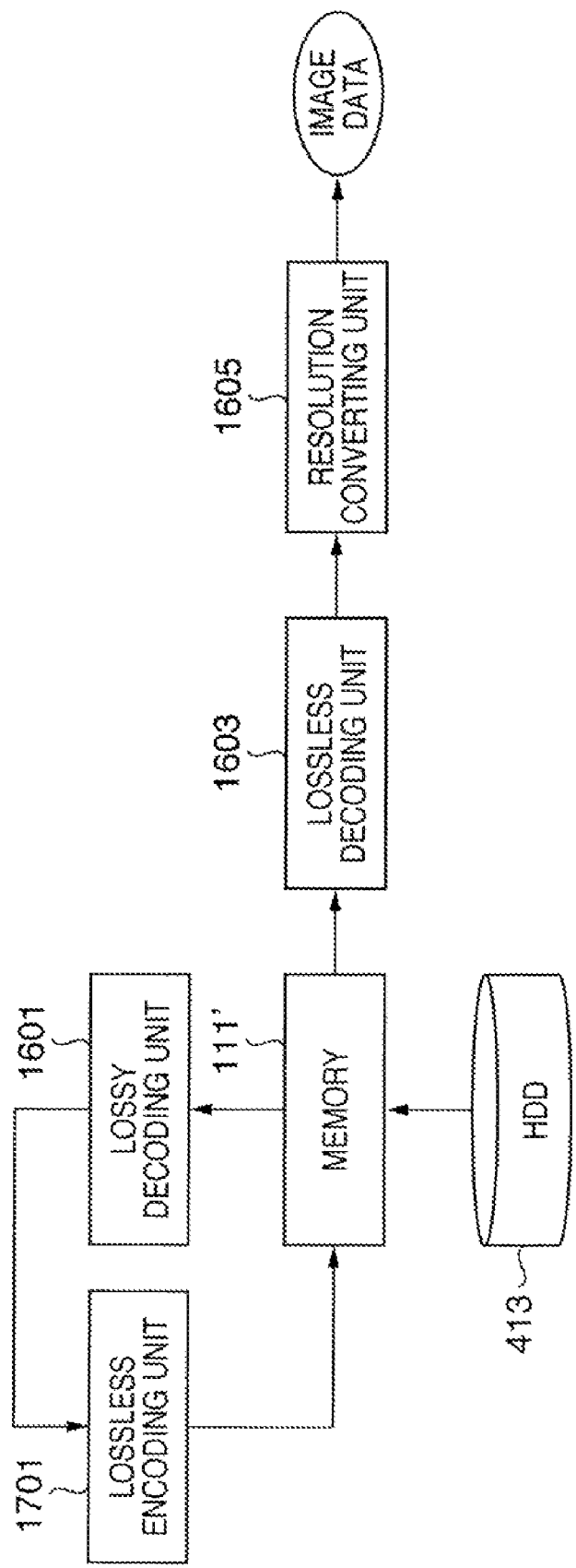
FIG. 17 is a block diagram of an apparatus for decoding encoded data obtained by the second to fourth embodiments.

FIG. 17 is a block diagram of an apparatus for decoding encoded data generated by the image processing apparatus of the second to fourth embodiments. The decoding processing is executed based on the timing chart shown in FIG. 18 as in the arrangement of FIG. 16.

The decoding processing of FIG. 17 is basically the same as that of the arrangement in FIG. 16, except for the following points.

(1) Data decoded by the lossy decoding unit 1601 are not directly stored in the memory 111' but are encoded by a lossless encoding unit 1701 and are then stored in the memory 111'.

(2) All data are temporarily converted into lossless-encoded data.

(3) All encoded data are lossless-decoded within the second page time period.

(4) The resolution converting unit 1605 executes resolution conversion processing for data after lossless decoding in accordance with their resolutions. All data after resolution conversion are 2400-dpi image data.

With the aforementioned decoding processing, the encoded data generated by the second to fourth embodiments can be decoded to original data.

In the description of the above embodiments, JPEG-LS is adopted as lossless encoding, and JPEG is adopted as lossy encoding. However, the present invention is not limited to these specific encoding schemes. Other lossless and lossy encoding techniques may be adopted. However, like the relationship between JPEG-LS and JPEG, two encoding techniques one of which is suited to artificial images with a fewer number of tone levels, the other of which is suited to natural images with a large number of tone levels, and which have a complementary relationship, are desirably adopted.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent No. 2006-056904, filed Mar. 2, 2006, which is hereby incorporated by reference herein in its entirety.

What is claimed is:

1. An image encoding apparatus comprising:
a determination unit which determines for respective tiles whether image data of a page of interest is to be lossless-encoded or lossy-encoded;
a lossless encoding unit which lossless-encodes tile image data which is determined by said determination unit to be lossless-encoded;
a storage unit which temporarily stores tile image data determined by said determination unit to be lossy-encoded;
a resolution converting unit which reduces a number of pixels of non-compressed tile image data held in said storage unit so that a data size of the non-compressed tile image data held in said storage unit becomes not more than a predetermined size, during lossless encoding of the image data of the page of interest; and
a lossy encoding unit which lossy-encodes the non-compressed tile image data of the page of interest held in said storage unit after completion of the lossless encoding of the image data of the page of interest,
wherein said lossless encoding unit includes:
a buffer memory which temporarily stores non-compressed tile image data;
a second resolution converting unit which reduces a number of pixels of the tile image data stored in said buffer memory in accordance with input setting information;
a selection unit which, when said determination unit determines that tile image data of interest is to be lossless-encoded, selects lossless-encoded data generated from the tile image data of interest, for, when said determination unit determines that the tile image data of interest is to be lossy-encoded, selecting the tile image data before compression stored in said buffer memory, and for outputting the selected data to said storage unit;
a counting unit which counts a number of times of selection of the tile image data stored in said buffer memory by said selection unit; and
an updating unit which updates the setting information to be set in said second resolution converting unit every time the number of times counted by said counting unit exceeds one of a plurality of thresholds determined according to the predetermined size.

2. The apparatus according to claim 1, wherein said resolution converting unit recursively applies resolution conversion to non-compressed data stored in said storage unit every time a tile image data size of non-compressed data held in said storage unit exceeds the predetermined size.

3. The apparatus according to claim 1, wherein the predetermined size is determined depending on an encoding processing capability of said lossy encoding unit.

4. A method of controlling an image encoding apparatus, comprising:
a determination step of determining for respective tiles whether image data of a page of interest is to be lossless-encoded or lossy-encoded;
a lossless encoding step of lossless-encoding tile image data which is determined in the determination step to be lossless-encoded;
a storage step of temporarily storing tile image data which is determined in the determination step to be lossy-encoded in storage means;
a resolution converting step of reducing a number of pixels of non-compressed tile image data held in the storage means so that a data size of the non-compressed tile image data held in the storage means becomes not more than a predetermined size, during lossless encoding of the image data of the page of interest; and
a lossy encoding step of lossy-encoding the non-compressed tile image data of the page of interest held in the storage means after completion of the lossless encoding of the image data of the page of interest,
wherein said lossless encoding step includes:
a temporarily storing step of storing, in a buffer memory, non-compressed tile image data;
a second resolution converting step of reducing a number of pixels of the tile image data stored in said buffer memory in accordance with input setting information;

a selection step of, when said determination step determines that tile image data of interest is to be lossless-encoded, selecting lossless-encoded data generated from the tile image data of interest, for, when said determination step determines that the tile image data of interest is to be lossy-encoded, selecting the tile image data before compression stored in said buffer memory, and for outputting the selected data to be stored by said storage step;

a counting step of counting a number of times of selection of the tile image data stored in said buffer memory by said selection step; and an updating step of updating the setting information to be set in said second resolution converting step every time the number of times counted by said counting step exceeds one of a plurality of thresholds determined according to the predetermined size.

* * * * *